(12) United States Patent
Huang et al.

(10) Patent No.: US 12,386,216 B2
(45) Date of Patent: Aug. 12, 2025

(54) DISPLAY DEVICE

(71) Applicant: Wistron Corporation, New Taipei (TW)

(72) Inventors: Guo-Wei Huang, New Taipei (TW); You-Gang Wang, New Taipei (TW); Ai Xu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 361 days.

(21) Appl. No.: 17/718,358

(22) Filed: Apr. 12, 2022

(65) Prior Publication Data
US 2023/0213802 A1 Jul. 6, 2023

(30) Foreign Application Priority Data
Dec. 31, 2021 (CN) .......................... 202111674025.6

(51) Int. Cl.
*G02F 1/1333* (2006.01)

(52) U.S. Cl.
CPC .... *G02F 1/13332* (2021.01); *G02F 1/133317* (2021.01); *G02F 1/133322* (2021.01)

(58) Field of Classification Search
CPC ........... G02F 1/13332; G02F 1/133317; G02F 1/133322; G02F 1/133314; G02F 1/133308; G02F 1/1336
See application file for complete search history.

(56) References Cited

U.S. PATENT DOCUMENTS

| | | | |
|---|---|---|---|
| 2013/0265526 A1* | 10/2013 | Park ..................... | G02B 6/0073 349/65 |
| 2019/0094602 A1* | 3/2019 | Jung .................. | G02F 1/133603 |
| 2022/0163838 A1* | 5/2022 | Lin .................... | G02F 1/133512 |

FOREIGN PATENT DOCUMENTS

| CN | 204287658 U | * | 4/2015 |
|---|---|---|---|
| CN | 214669968 U | | 11/2021 |
| CN | 215301083 U | | 12/2021 |

OTHER PUBLICATIONS

Examination report dated Nov. 21, 2022, listed in related Taiwan patent application No. 111101562.

(Continued)

*Primary Examiner* — Jennifer D. Carruth
*Assistant Examiner* — Agnes Dobrowolski
(74) *Attorney, Agent, or Firm* — McClure, Qualey & Rodack, LLP

(57) ABSTRACT

A display device includes a front frame, a middle frame, a panel assembly, a middle-rear frame, and a backlight assembly. The front frame includes a front-frame side plate and a front-frame edge plate connected to the front-frame side plate. The middle frame includes a middle-frame side plate and a middle-frame bottom plate connected to the middle-frame side plate, and the middle-frame side plate is adjacent to the front-frame side plate and the front-frame edge plate. The panel assembly is adjacent to the front-frame edge plate and the middle-frame side plate. The middle-rear frame has a middle-rear-frame side plate and a middle-rear-frame bottom plate connected to the middle-rear-frame side plate, and the middle-rear-frame side plate is adjacent to the middle-frame side plate and the middle-frame bottom plate. The backlight assembly is adjacent to the middle-frame bottom plate and the middle-rear-frame side plate.

14 Claims, 15 Drawing Sheets

(56) References Cited

OTHER PUBLICATIONS

Examination report dated Feb. 22, 2025, listed in related China patent application No. 202111674025.6.

* cited by examiner

DISPLAY DEVICE

CROSS-REFERENCE TO RELATED APPLICATION

This non-provisional application claims priority under 35 U.S.C. § 119(a) to Patent Application No. 202111674025.6 filed in China on Dec. 31, 2021, and the entire contents of which are hereby incorporated by reference.

BACKGROUND

Technical Field

The instant disclosure relates to a display device, particularly a display device with a narrow outer frame.

Related Art

Currently, a variety of display devices with different specifications suitable for different purposes are available for consumers to select. Upon selecting from such display devices, in addition to the functions and specifications of the display devices, consumers often intuitively consider the appearance of the display devices and take it as one of the considerations for whether to purchase or not.

SUMMARY

In view of this, how to provide a display device with a more attractive appearance for consumers, and even be favored by consumers, has become one of the problems to be solved.

The display devices on the market cannot provide narrower outer frames mostly because of the assembling arrangements between panel components and frame elements. Therefore, for the display device with a wide outer frame known to the inventor, in addition to the appearance of the display device with the wide outer frame that is difficult to be accepted or even favored by consumers, the device also has some shortcomings such as the overall weight of the display device is relatively heavier, and the image-display area of the display device is relatively smaller.

Accordingly, according to some embodiments, a display device comprises a front frame, a middle frame, a panel assembly, a middle-rear frame, and a backlight assembly. The front frame has a front-frame side plate and a front-frame edge plate. The front-frame edge plate is connected to the front-frame side plate. The middle frame has a middle-frame side plate and a middle-frame bottom plate. The middle-frame bottom plate is connected to the middle-frame side plate, and the middle-frame side plate is adjacent to the front-frame side plate and the front-frame edge plate. The panel assembly is adjacent to the front-frame edge plate and the middle-frame side plate. The middle-rear frame has a middle-rear-frame side plate and a middle-rear-frame bottom plate. The middle-rear-frame bottom plate is connected to the middle-rear-frame side plate, and the middle-rear-frame side plate is adjacent to the middle-frame side plate and the middle-frame bottom plate. The backlight assembly is adjacent to the middle-frame bottom plate and the middle-rear-frame side plate.

According to some embodiments, the front-frame edge plate has a first blocking portion between the panel assembly and the middle-frame side plate.

According to some embodiments, the front frame has a first fixing portion, and the first fixing portion is buckled to the middle-frame side plate.

According to some embodiments, the middle frame has a first assembling portion, and the first assembling portion is buckled to the first fixing portion.

According to some embodiments, the first fixing portion has a guiding bevel, and a height of the guiding bevel increases along a direction in which the first assembling portion is buckled to the first fixing portion.

According to some embodiments, the middle frame has a second blocking portion between the backlight assembly and the middle-rear-frame side plate.

According to some embodiments, the display device further comprises a rear shell having a rear-shell side plate and a rear-shell bottom plate. The rear-shell bottom plate is connected to the rear-shell side plate, and the rear-shell side plate is between the middle-rear-frame side plate and the front-frame side plate.

According to some embodiments, the middle-rear frame has a limiting assembling portion, and the limiting assembling portion limits the rear shell.

According to some embodiments, the rear shell has a limiting portion. One of two ends of the limiting portion is on the rear-shell bottom plate, and the other end of the limiting portion is in the limiting assembling portion.

According to some embodiments, the limiting portion has a limiting slot on a side of the limiting portion, and the side of the limiting portion faces the limiting assembling portion. The limiting portion has a first width in a first direction, and the limiting slot has a second width in a second direction. The first direction is parallel to the direction of the middle-rear-frame bottom plate, and the second direction is perpendicular to the first direction.

According to some embodiments, the limiting assembling portion has an opening. The opening has an opening width in the first direction and an opening depth in the second direction. The opening width is greater than the first width, and the opening depth is greater than the second width.

According to some embodiments, the front frame has a second fixing portion, and the second fixing portion is buckled to the rear-shell side plate.

According to some embodiments, the rear shell has a second assembling portion, and the second assembling portion is buckled to the second fixing portion.

According to some embodiments, the middle-rear frame has a third fixing portion, and the third fixing portion is buckled to the middle-frame side plate.

According to some embodiments, the middle frame has a third assembling portion, and the third assembling portion is buckled to the third fixing portion.

To sum up, in some embodiments, through the connection and assembling arrangement between the front frame and the middle frame, the display device thus has a narrower outer frame than the conventional display device so as to have advantages of a relatively lighter overall weight and a relatively larger image-display area. Therefore, according to some embodiments of the instant disclosure, a display device with a more competitive appearance and specifications can be provided.

In addition, in some embodiments, through the connection and assembling arrangement between the front frame and the middle-rear frame as well as the connection and assembling arrangement between the middle frame and the middle-rear frame, the display device thus is more stably connected with a narrower outer frame, and the display device can have advantages of a relatively lighter overall weight and a relatively larger image-display area. Therefore, in addition to the competitive advantages of a more attractive appearance and specifications, according to some embodiments of the instant disclosure, a display device with a better assembling stability than the conventional display device can be also provided.

In addition, in some embodiments, the display device may further comprise a rear shell. With the connection and assembling arrangement between the front frame and the rear shell, and/or between the middle-rear frame and the rear shell, according to some embodiments, internal damage of the display device can be prevented upon the rear side of the display device is impacted by external forces or upon the display device falls down.

Moreover, in some embodiments, the middle-rear frame may further have a limiting assembling portion, and the rear shell may further have a limiting portion. Through the connection, assembling, and limiting arrangement between the limiting assembling portion and the limiting portion, the display device according to some embodiments may further provide limiting and fixing functions for the components inside the display device in the limiting direction (for example, the horizontal direction and/or the vertical direction). Therefore, the display device according to some embodiments avoids the shortcomings of shaking that is easily generated to the display device known to the inventor in the limiting direction. Hence, in addition to the competitive advantages of a more attractive appearance and specifications, according to some embodiments of the instant disclosure, a display device capable of avoiding the deficiencies in internal assembling and fixing arrangement can be also provided.

The detailed features and advantages of the present disclosure are described in detail in the following embodiments, and the content is sufficient to enable any person who is familiar with the relevant art to understand the technical contents of the present disclosure and implement them accordingly. Based on the disclosed contents of the specification, claim(s) and drawing(s), any person who is familiar with the relevant art can easily understand the purposes and advantages related to the embodiments of the present disclosure.

DETAILED DESCRIPTION

The following description is supplemented with the drawings to illustrate the embodiments of the present disclosure more clearly.

Figure 1A:
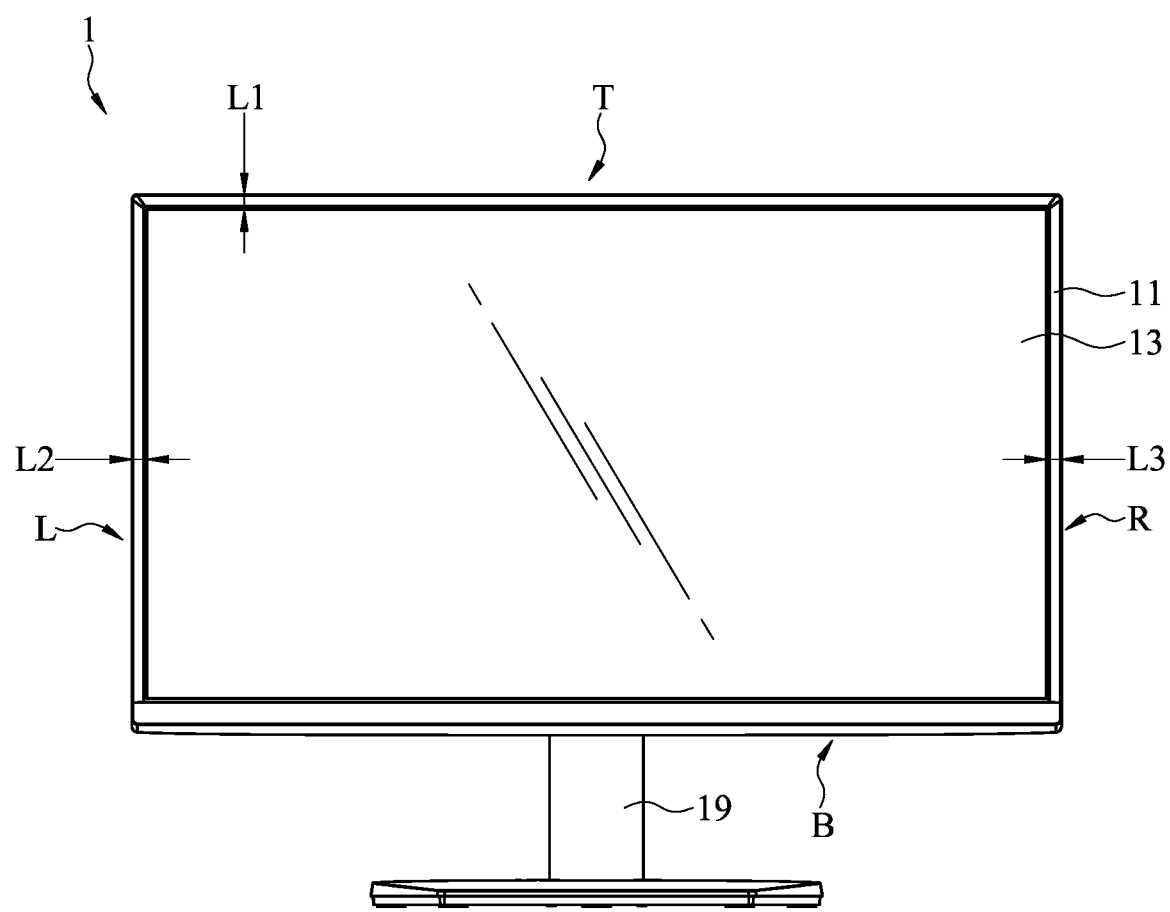
FIG. 1A illustrates a perspective view of a display device according to some embodiments.
Figure 1B:
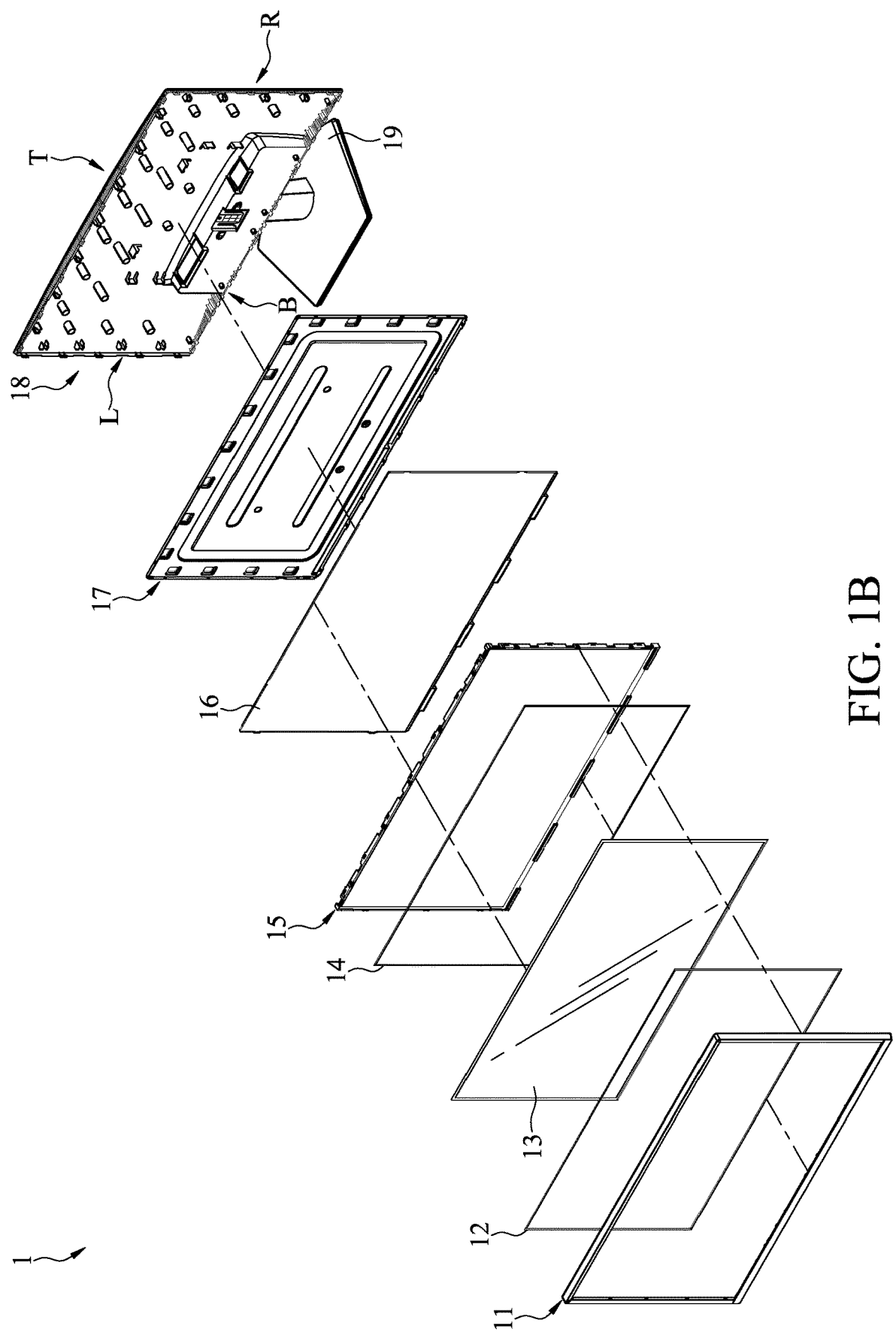
FIG. 1B illustrates an exploded view of the display device according to some embodiments shown in FIG. 1A.

Please refer to FIG. 1A and FIG. 1B. FIG. 1A illustrates a perspective view of a display device 1 according to some embodiments, and FIG. 1B illustrates an exploded view of the display device 1 according to some embodiments shown in FIG. 1A; where the T side, the L side, the R side, and the B side are denoted as the top side, the left side, the right side, and the bottom side of the display device 1, respectively. In FIG. 1A and FIG. 1B, a display device 1 comprises a front frame 11, a middle frame 15, a panel assembly 13, a middle-rear frame 17, and a backlight assembly 16. The panel assembly 13 comprises a liquid crystal (LCD) panel. After the panel assembly 13 is combined with the backlight assembly 16 acting as a backlight source, the combined assembly is capable of emitting light and generating images on the LCD panel. In FIG. 1B, the above frames are arranged in the following order: the front frame 11, the middle frame 15, and the middle-rear frame 17. The panel assembly 13 is adjacent to the front frame 11 and the middle frame 15, and the backlight assembly 16 is adjacent to the middle frame 15 and the middle-rear frame 17. Therefore, through the connection and assembling arrangement between the above frames and assemblies, the display device 1 according to some embodiments can utilize the outer frame (that is, the front frame 11, the middle frame 15, and the middle-rear frame 17) to fix the panel assembly 13 and backlight assembly 16 which are provided for displaying images. In some embodiments, the display device 1 is a panel display device, such as a computer, a TV, or other display devices that can play or display images.

According to some embodiments, the display device 1 further comprises a supporting element 19 on the B side of the display device 1. For example, the supporting element 19 is disposed on the B side of the front frame 11 or on the B side of the rear shell 18 (which will be described later). Therefore, according to some embodiments, the display device 1 not only can be disposed on a vertical surface (such as a wall or any flat vertical surface) but also can be disposed and supported on a horizontal surface (such as a desktop, the ground, or any flat horizontal surface) by the supporting element 19. In FIG. 1A and FIG. 1B, the display device 1 further comprises a supporting element 19, and the supporting element 19 is disposed on the B side of the rear shell 18 to support the display device 1 and prevent the display device 1 on a surface from shaking apparently.

Subsequently, implementations of the connection and assembling arrangement between the frames and assemblies of the display device 1 will be described.

Figure 6A:
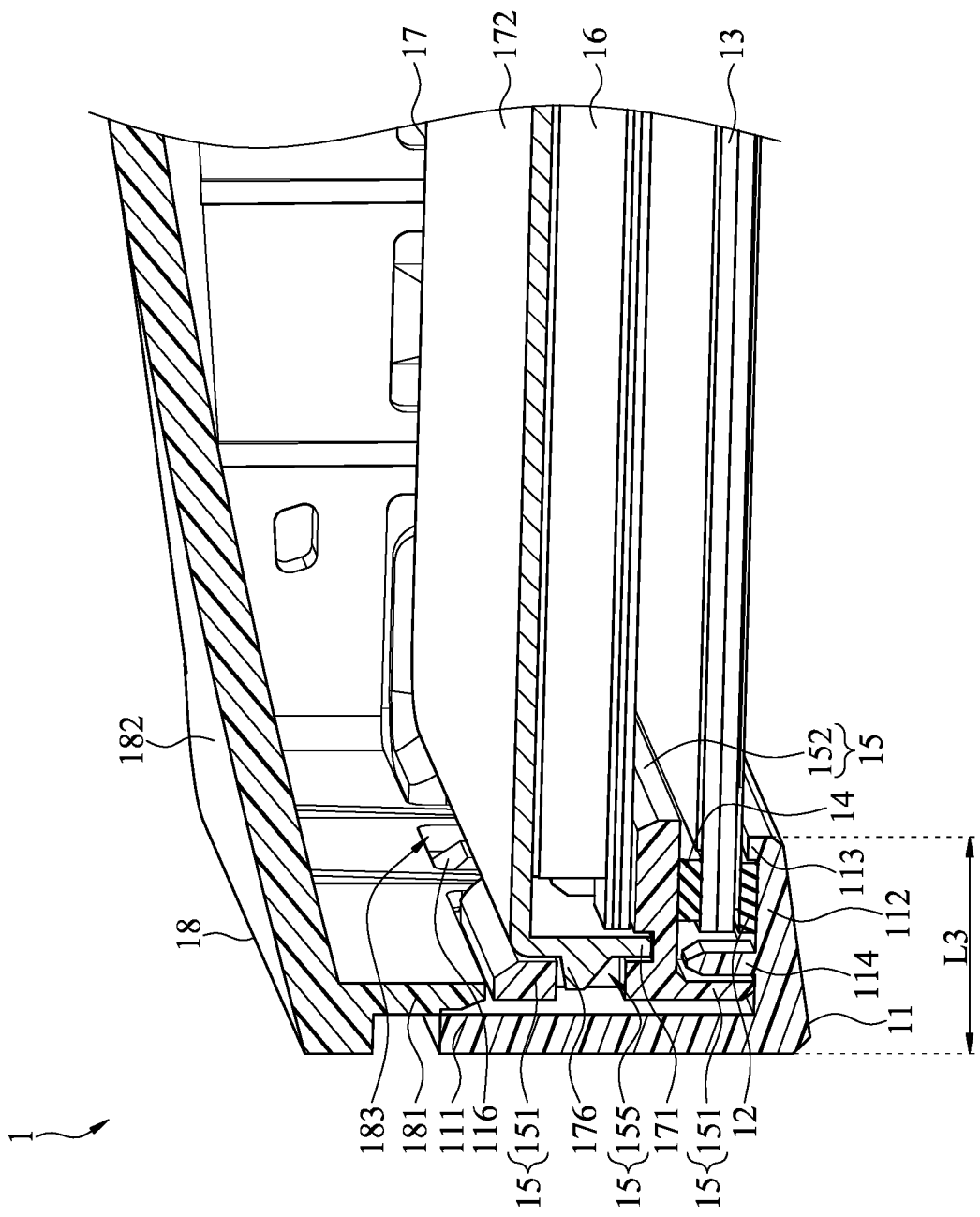
FIG. 6A illustrates a first partial cross-sectional schematic view of a display device according to some embodiments.
Figure 6B:
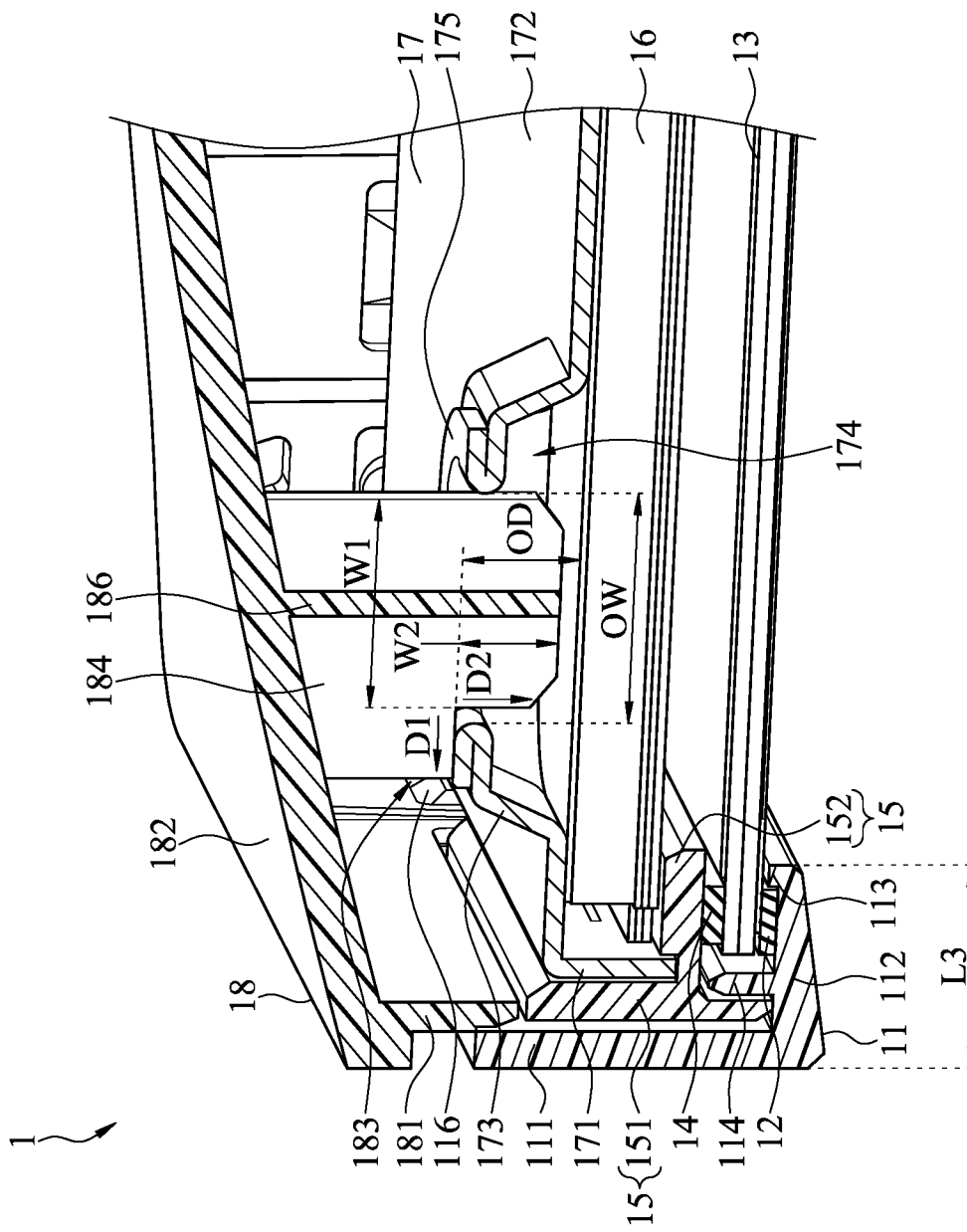
FIG. 6B illustrates a second partial cross-sectional schematic view of a display device according to some embodiments.
Figure 6C:
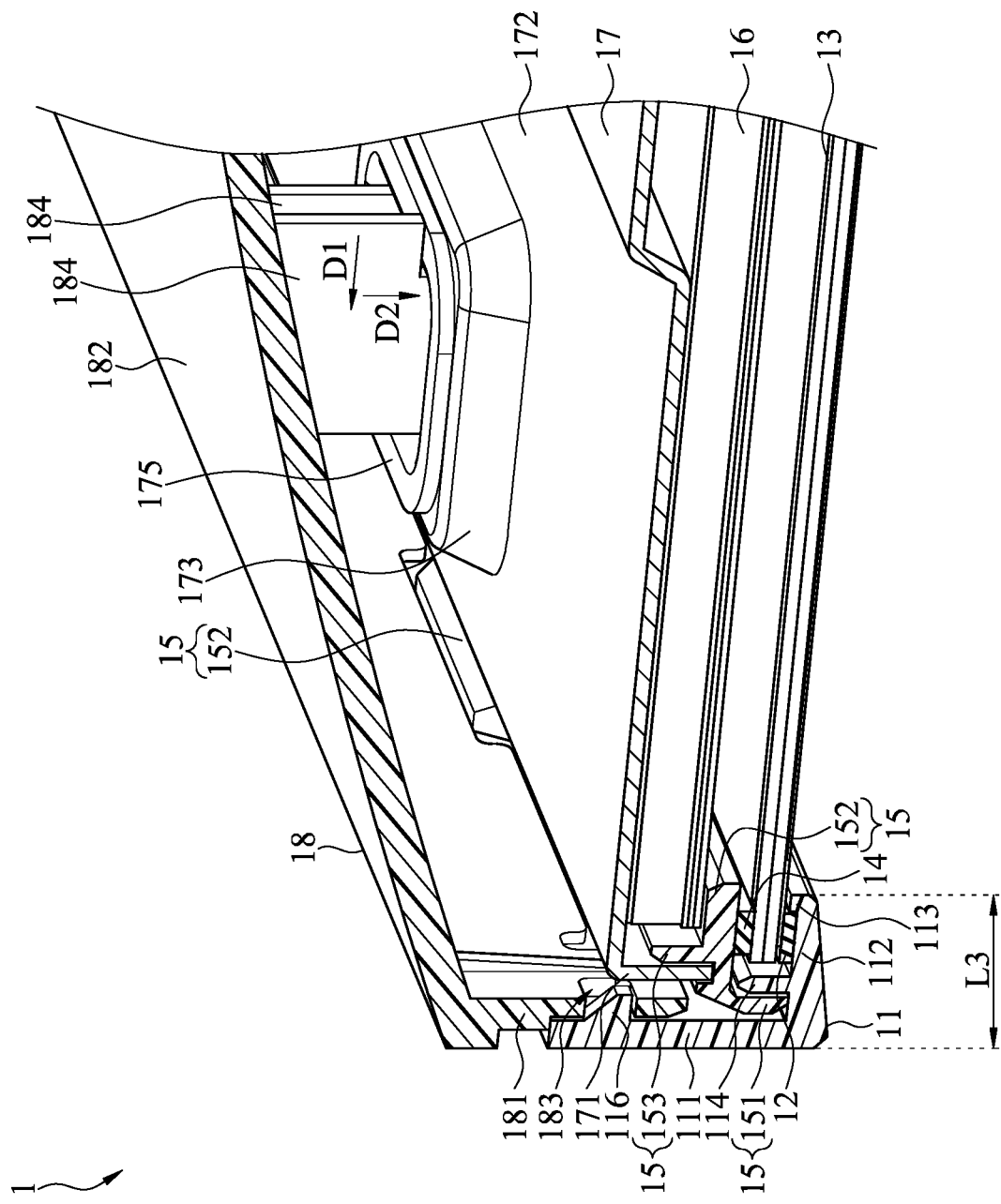
FIG. 6C illustrates a third partial cross-sectional schematic view of a display device according to some embodiments.
Figure 6D:
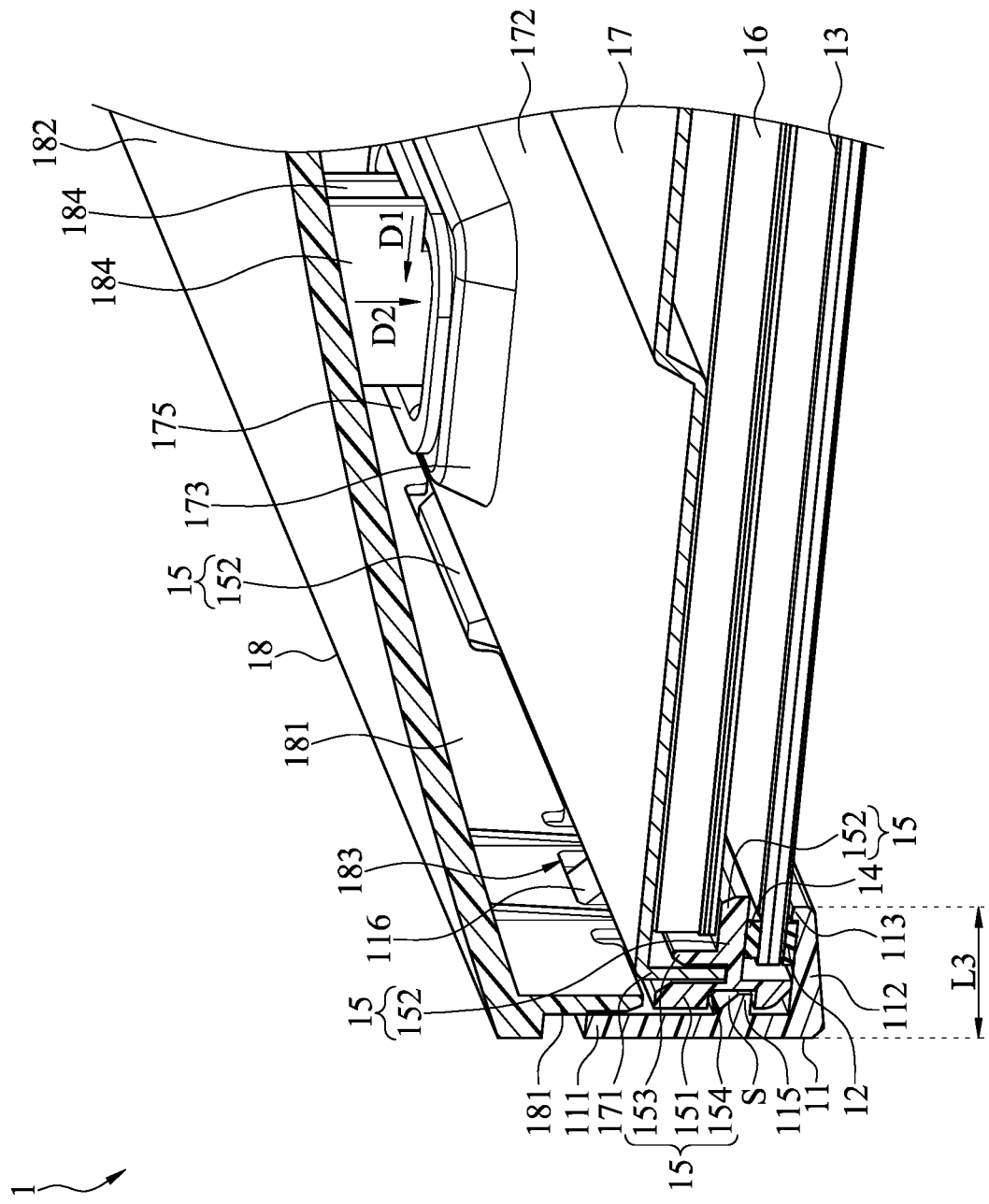
FIG. 6D illustrates a fourth partial cross-sectional schematic view of a display device according to some embodiments.

Please refer to FIG. 6D. FIG. 6D illustrates a fourth partial cross-sectional schematic view of a display device 1 according to some embodiments, which is just one of the various implementations of the connection and assembling arrangements of the outer frame of the display device 1. The embodiments of the instant disclosure include, but are not limited to, the embodiments shown in FIG. 6D.

In FIG. 6D, the front frame 11 has a front-frame side plate 111 and a front-frame edge plate 112, and the front-frame edge plate 112 is connected to the front-frame side plate 111. The middle frame 15 has a middle-frame side plate 151 and a middle-frame bottom plate 152, and the middle-frame bottom plate 152 is connected to the middle-frame side plate 151. The middle-frame side plate 151 is adjacent to the front-frame side plate 111 and the front-frame edge plate 112 (for example, the middle-frame side plate 151 is between the front-frame side plate 111 and the front-frame edge plate 112). The middle-rear frame 17 has a middle-rear-frame side plate 171 and a middle-rear-frame bottom plate 172, and the middle-rear-frame bottom plate 172 is connected to the middle-rear-frame side plate 171. The middle-rear-frame side plate 171 is adjacent to the middle-frame side plate 151 and the middle-frame bottom plate 152 (for example, the middle-rear-frame side plate 171 is between the middle-frame side plate 151 and the middle-frame bottom plate 152). The term "connected/connection" may independently refer to the same or different connection manners, and the connection manner may include molded into a one-piece member (that is, integrally formed) or other physical connections (such as adhering, buckling, joggling, or locking), all of which are included within the scope of the embodiments according to the instant disclosure. The panel assembly 13 is adjacent to the front-frame edge plate 112 and the middle-frame side plate 151 (for example, the panel assembly 13 is between the front-frame edge plate 112 and the middle-frame side plate 151), and the backlight assembly 16 is adjacent to the middle-frame bottom plate 152 and the middle-rear-frame side plate 171 (for example, the backlight assembly 16 is between the middle-frame bottom plate 152 and the middle-rear-frame side plate 171). Therefore, through the connection and assembling arrangement of the outer frame, the display device 1 according to some embodiments of the instant disclosure can utilize the outer frame to fix the panel assembly 13 and the backlight assembly 16 which are provided for displaying images.

According to some embodiments, the display device 1 further comprises a first adhering element 12 between the front frame 11 and the middle frame 15. Preferably, in some embodiments, the first adhering element 12 is between the front frame 11 and the panel assembly 13. According to some embodiments, the display device 1 further comprises a second adhering element 14 between the front frame 11 and the middle frame 15. Preferably, in some embodiments, the second adhering element 14 is between the panel assembly 13 and the middle frame 15. The first adhering element 12 and the second adhering element 14 may be independently the same or different cushioning and/or impact-resistant materials, such as rubber, foam, sponge, or combinations thereof. Therefore, through the assembling arrangement of the first adhering element 12 and/or the second adhering element 14, the panel assembly 13 can be prevented from directly contacting the front frame 11 and/or the middle frame 15. Therefore, the outer edge of the panel assembly 13 (that is, portions of the panel assembly 13 which would have been in direct contact with the front frame 11 and/or the middle frame 15) can be prevented from being damaged upon the outer portion of the display device 1 is impacted by external forces or upon the display device 1 falls down. In FIG. 6D and FIG. 1B, the display device 1 further comprises a first adhering element 12 and a second adhering element 14. The first adhering element 12 is between the front-frame edge plate 112 and the panel assembly 13, and the second adhering element 14 is between the panel assembly 13 and the middle-frame bottom plate 152.

In FIG. 6D, according to some embodiments, the front-frame edge plate 112 has a barb portion 113. The barb portion 113 is on a side of the front-frame edge plate 112, and the side of the front-frame edge plate 112 is away from the front-frame side plate 111 and faces the panel assembly 13. Therefore, through the arrangement of the barb portion 113, the first adhering element 12 can be prevented from detaching off the display device 1 upon the display device 1 is impacted by external forces or upon the display device 1 falls down, which will lead to the damage of the outer edge of the panel assembly 13 (that is, portions of the panel assembly 13 which would have been protected by the first adhering element 12).

Please refer to FIG. 6D and FIG. 1A, the front-frame edge plate 112 has front-frame edge plate widths L1, L2, L3 respectively on the T side (the top side), the L side (the left side), and the R side (the right side) of the display device 1. The front-frame edge plate widths L1, L2, L3 may be independently the same or different widths from each other. For example, the front-frame edge plate widths L1, L2, L3 may be independently less than or equal to 12 mm, or less than or equal to 11 mm, or less than or equal to 10 mm, or less than or equal to 9 mm, or less than or equal to 8 mm, or less than or equal to 7 mm, or less than or equal to 6.6 mm, or less than or equal to 6 mm, or less than or equal to 5.5 mm, or less than or equal to 5 mm. For example, the front-frame edge plate widths L1, L2, L3 are all equal to 6.6 mm; or for another example, the front-frame edge plate widths L2, L3 are all equal to 6.6 mm, and the front-frame edge plate width L1 is greater than 6.6 mm (e.g., 6.9 mm); for yet another example, only the front-frame edge plate width L3 is equal to 6.6 mm, while the front-frame edge plate widths L1, L2 are respectively less than 7 mm (e.g., 6.9 mm) and less than 10 mm (e.g., 9.2 mm). In addition, according to some embodiments, the width or the size of each side of the middle frame 15 and the middle-rear frame 17 (and/or the rear shell 18, which will be described later) correspondingly connected to and assembled with the front frame 11 should be independently and correspondingly less than the front-frame edge plate widths L1, L2, L3 of the connected front-frame edge plate 112. Therefore, some embodiments of the instant disclosure can further provide a display device 1 having the narrow outer frame with the above-mentioned front-frame edge plate widths L1, L2, L3, thereby avoiding the display device 1 to have the unfavorable frame appearance and specifications of the conventional display device.

According to some embodiments, the front frame 11 further has a first fixing portion 115, and the first fixing portion 115 is buckled to the middle-frame side plate 151. According to some embodiments, the middle frame 15 has a first assembling portion 154, and the first fixing portion 115 is buckled to the first assembling portion 154. The first assembling portion 154 may be a concave portion or a convex portion, which is disposed corresponding to the first fixing portion 115, so that the first assembling portion 154 and the first fixing portion 115 can be matched and buckled with each other. The term "matched and buckled" refers to a physically fixing arrangement between the elements that are buckled with each other, which can be removed when an external force exceeding a certain threshold value is applied to the elements. Hence, the term "matched and buckled" also covers the detachable buckling connections as well as the buckling connections that can be disassembled and assembled repeatedly. Therefore, the first assembling portion 154 and the first fixing portion 115 are matched and buckled with each other, thereby fixing the front frame 11 to the middle frame 15. According to some embodiments, the first fixing portion 115 is a convex portion, and the first assembling portion 154 is a concave portion; in contrast, for another example, the first fixing portion 115 is a concave portion, and the first assembling portion 154 is a convex portion. In FIG. 6D, the front frame 11 has a first fixing portion 115, and the first fixing portion 115 is a convex portion on the front-frame side plate 111. The middle frame 15 has a first assembling portion 154, and the first assembling portion 154 is a concave portion corresponding to the first fixing portion 115 and on the middle-frame side plate 151. Therefore, the first fixing portion 115 of the front frame 11 is buckled to the first assembling portion 154 of the middle frame 15, thereby fixing the front frame 11 to the middle frame 15. For example, in FIG. 6D, the first assembling portion 154 is a concave portion on the middle-frame side plate 151 and is adjacent to the side of the front-frame side plate 111, and the first fixing portion 115 is a convex portion on the front-frame side plate 111 and is adjacent to the side of the middle-frame side plate 151. The first assembling portion 154 is correspondingly matched and buckled to the first fixing portion 115. Therefore, the first assembling portion 154 and the first fixing portion 115 are buckled with each other, thereby fixing the front frame 11 to the middle frame 15.

In FIG. 6D, according to some embodiments, the first fixing portion 115 is a convex portion (while the first assembling portion 154 is a concave portion corresponding to the convex portion), and the convex portion has a guiding bevel S. A height of the guiding bevel S gradually increases along a direction approaching the front-frame edge plate 112. In other words, the height of the guiding bevel S increases along a direction in which the first assembling portion 154 is buckled to the first fixing portion 115. That is, a side of the guiding bevel S away from the front-frame edge plate 112 has a relatively shortest height, and the height of the guiding bevel S increases along a direction approaching the front-frame edge plate 112, so that a side of the guiding bevel S near to the front-frame edge plate 112 has a relatively highest height. Therefore, upon buckling the first fixing portion 115 to the first assembling portion 154, the convex portion can be quickly and effectively guided to the concave portion by the arrangement of the guiding bevel S of the first fixing portion 115, thereby reducing the assembling time of the components of the display device 1.

Figure 6E:
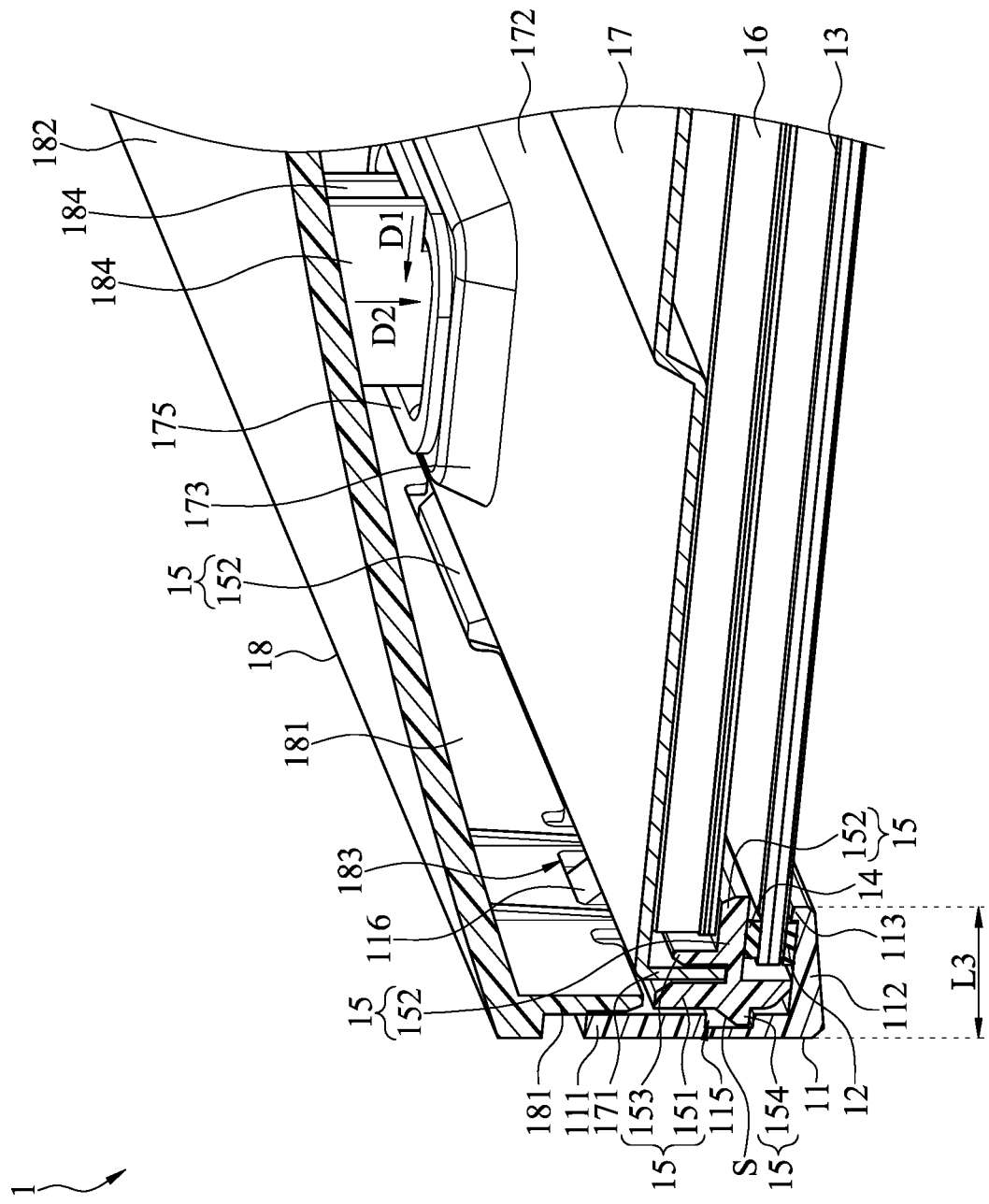
FIG. 6E illustrates a fifth partial cross-sectional schematic view of a display device according to some embodiments.

Please refer to FIG. 6E. FIG. 6E illustrates a fifth partial cross-sectional schematic view of a display device 1 according to some embodiments. In FIG. 6E, a first fixing portion 115 is a concave portion (while the first assembling portion 154 is a convex portion corresponding to the concave portion), and the convex portion has a guiding bevel S. A height of the guiding bevel S gradually increases along a direction approaching the front-frame edge plate 112. In other words, the height of the guiding bevel S increases along a direction in which the first assembling portion 154 is buckled to the first fixing portion 115. That is, a side of the guiding bevel S away from the front-frame edge plate 112 has a relatively shortest height, and the height of the guiding bevel S increases along a direction approaching the front-frame edge plate 112, so that a side of the guiding bevel S near to the front-frame edge plate 112 has a relatively highest height. Therefore, upon buckling the first fixing portion 115 to the first assembling portion 154, the convex portion can be quickly and effectively guided to the concave portion by the arrangement of the guiding bevel S of the first assembling portion 154, thereby reducing the assembling time of the components of the display device 1.

According to some embodiments, the middle frame 15 further has a second blocking portion 153, and the second blocking portion 153 is between the backlight assembly 16 and the middle-rear-frame side plate 171. In FIG. 6D, the middle-frame side plate 151 and the middle-frame bottom plate 152 of the middle frame 15 are connected to each other to form a T-shaped middle frame 15. The middle frame 15 has a second blocking portion 153. The second blocking portion 153 is on a side of the middle-frame bottom plate 152, and the side of the middle-frame bottom plate 152 is away from the front-frame edge plate 112. Therefore, the middle-rear-frame side plate 171 of the middle-rear frame 17 can be arranged between the middle-frame side plate 151 and the second blocking portion 153, thus facilitating in the assembling and positioning between the middle frame 15 and the middle-rear frame 17. Moreover, since the middle-rear-frame side plate 171 of the middle-rear frame 17 can be arranged between the middle-frame side plate 151 and the second blocking portion 153, after the middle frame 15 and the middle-rear frame 17 are assembled with each other, the middle frame 15 and the middle-rear frame 17 can be prevented from shaking with respect to each other. In addition, the second blocking portion 153 is between the backlight assembly 16 and the middle-rear-frame side plate 171. Therefore, through the arrangement of the second blocking portion 153, the backlight assembly 16 can be prevented from directly contacting the middle-rear frame 17. Therefore, the outer edge of the backlight assembly 16 (that is, portions of the backlight assembly 16 which would have been in direct contact with the middle-rear-frame side plate 171) can be prevented from being damaged upon the outer portion of the display device 1 is impacted by external forces or upon the display device 1 falls down.

According to some embodiments, the display device 1 further comprises a rear shell 18, and the rear shell 18 has a rear-shell side plate 181 and a rear-shell bottom plate 182. The rear-shell bottom plate 182 is connected to the rear-shell side plate 181, and the rear-shell side plate 181 is between the middle-rear-frame side plate 171 and the middle-rear-frame bottom plate 172. Similarly, the term "connected/ connection" may independently refer to the same or different connection manners, and the connection manner may include molded into one-piece member (that is, integrally formed) or other physical connections (such as adhering, buckling, joggling or locking), all of which are included within the scope of the embodiments according to the instant disclosure. Therefore, through the arrangement of the rear shell 18, some embodiments of the instant disclosure thus have the rear shell 18 on the rear side of the display device 1. Hence, the rear side of the display device 1 can be prevented from being damaged upon the outer portion of the display device 1 is impacted by external forces or upon the display device 1 falls down.

According to some embodiments, the front frame 11 further has a second fixing portion 116, and the second fixing portion 116 is buckled to the rear-shell side plate 181. According to some embodiments, the rear shell 18 has a second assembling portion 183, and the second fixing portion 116 is buckled to the second assembling portion 183. The second assembling portion 183 may be a concave portion or a convex portion corresponding to the second fixing portion 116, so that the second assembling portion 183 and the second fixing portion 116 can be matched and buckled with each other. The term "matched and buckled" refers to a physically fixing arrangement between the elements that are buckled with each other, which can be removed when an external force exceeding a certain threshold value is applied to the elements. Hence, the term "matched and buckled" also covers the detachable buckling connections as well as the buckling connections that can be disassembled and assembled repeatedly. Therefore, the second assembling portion 183 and the second fixing portion 116 are matched and buckled with each other, thereby fixing the front frame 11 to the rear shell 18. According to some embodiments, the second fixing portion 116 is a convex portion, and the second assembling portion 183 is a concave portion; in contrast, for another example, the second fixing portion 116 is a concave portion, and the second assembling portion 183 is a convex portion. In FIG. 6D, the front frame 11 further has a second fixing portion 116, and the second fixing portion 116 is a convex portion on the front-frame side plate 111. The rear shell 18 further has a second assembling portion 183, and the second assembling portion 183 is a concave portion corresponding to the second fixing portion 116 and on the rear-shell side plate 181. Therefore, the second fixing portion 116 of the front frame 11 is buckled to the second assembling portion 183 of the rear shell 18, thereby fixing the front frame 11 to the rear shell 18. For example, in FIG. 6D, the second assembling portion 183 is on the rear-shell side plate 181 which is adjacent to a side of the front-frame side plate 111, and the second fixing portion 116 is on the front-frame side plate 111 which is adjacent to a side of the rear-shell side plate 181. The second assembling portion 183 is correspondingly matched and buckled to the second fixing portion 116. Therefore, the second assembling portion 183 and the second fixing portion 116 are buckled with each other, thereby fixing the front frame 11 to the rear shell 18.

According to some embodiments, the middle-rear frame 17 has a limiting assembling portion 173, and the limiting assembling portion 173 is on the middle-rear-frame bottom plate 172 to limit the rear shell 18. According to some embodiments, the rear shell 18 has a limiting portion 184. One of two ends of the limiting portion 184 is on the rear-shell bottom plate 182, and the other end of the limiting portion 184 is in the limiting assembling portion 173. The term "limit/limiting" refers to an assembling arrangement of the elements having a dimensional margin (that is, allowance) in one or more directions between the elements that are assembled with each other, and the assembling arrangement can be removed from the direction other than the direction of the dimensional margin even when an external force not exceeding a certain threshold value is applied to the elements. Hence, the term "limit/limiting" also covers the connection arrangement of the elements in which one element is received in another element and the element contacts the another element when an external force is applied. Therefore, by limiting the limiting portion 184 of the rear shell 18 at the limiting assembling portion 173 of the middle-rear frame 17, the rear shell 18 can be limited at the middle-rear frame 17, and the rear shell 18 can be prevented from shaking in one or more directions. Moreover, through the arrangement of the limiting portion 184 and the limiting assembling portion 173, the rear shell 18 can be quickly and effectively guided and assembled to the middle-rear frame 17 by the limiting assembling portion 173, thereby reducing the assembly time of the components of the display device 1. In FIG. 6D, the middle-rear frame 17 further has a limiting assembling portion 173 which is a convex structure and like a hollow bump. The limiting assembling portion 173 is on a side of the middle-rear-frame bottom plate 172, and the side of the middle-rear-frame bottom plate 172 faces the rear-shell bottom plate 182. The rear shell 18 further has a limiting portion 184, and one of two ends of the limiting portion 184 is on the rear-shell bottom plate 182. The size of the other end of the limiting portion 184 is less than the size of the end of the limiting portion 184, and the size of the other end of the limiting portion 184 is less than an opening size (that is, an opening width OW as shown in FIG. 6B, which will be described later) of the limiting assembling portion 173. Therefore, in this embodiment, only a part of the other end of the limiting portion 184 is received in the limiting assembling portion 173. Hence, by limiting the limiting portion 184 of the rear shell 18 at the limiting assembling portion 173 of the middle-rear frame 17, the rear shell 18 can be limited at the middle-rear frame 17, and the rear shell 18 can be prevented from shaking in one or more directions.

Figure 5A:
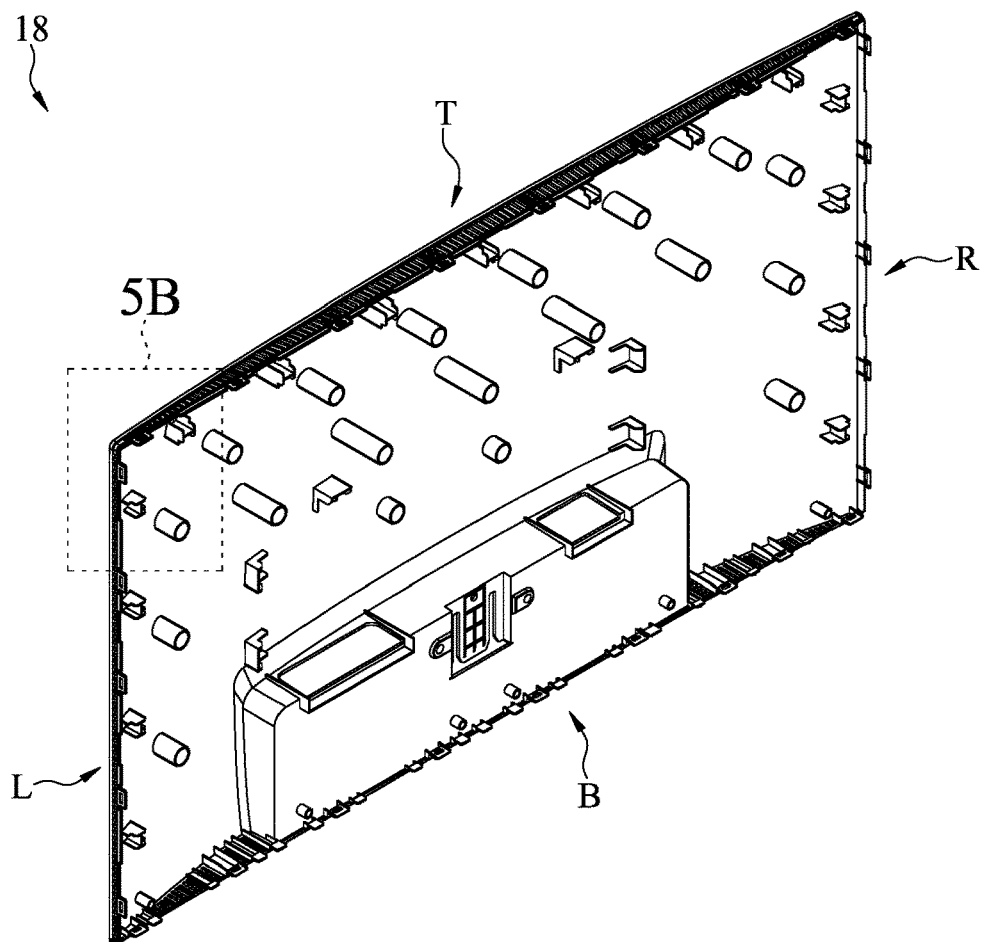
FIG. 5A illustrates a first perspective view of a rear shell of a display device according to some embodiments.
Figure 5B:
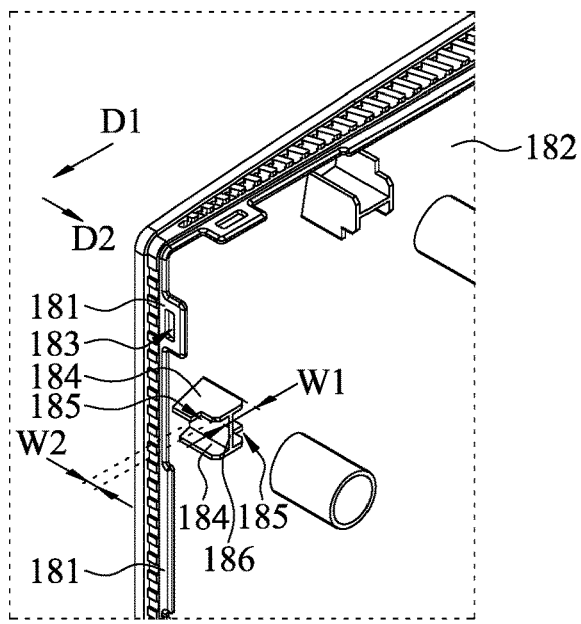
FIG. 5B illustrates an enlarged partial perspective view of the rear shell of the display device according to some embodiments shown in FIG. 5A.

Please refer to FIG. 6C, FIG. 6D, FIG. 5A, and FIG. 5B. FIG. 6C illustrates a third partial cross-sectional schematic view of a display device 1 according to some embodiments, which is just one of the various implementations of the connection and assembling arrangements of the outer frame of the display device 1. The embodiments of the instant disclosure include, but are not limited to, the embodiments shown in FIG. 6C. FIG. 5A illustrates a first perspective view of a rear shell 18 of a display device 1 according to some embodiments, and FIG. 5B illustrates an enlarged partial perspective view of the rear shell 18 of the display device 1 according to some embodiments shown in FIG. 5A. The limiting portion 184 has a limiting slot 185. The limiting slot 185 is on a side of the limiting portion 184, and the side of the limiting portion 184 faces the limiting assembling portion 173. The limiting portion 184 has a first width W1 in a first direction D1, and the limiting slot 185 has a second width W2 in a second direction D2. The first direction D1 is parallel to the direction of the middle-rear-frame bottom plate 172, and the second direction D2 is perpendicular to the first direction D1. In FIG. 5B, the side of the limiting portion 184 that is adjacent to and facing the limiting assembling portion 173 has a limiting slot 185. In this embodiment, since the limiting portion 184 has the limiting slot 185, the limiting portion 184 of the rear shell 18 on the plane along the first direction D1 is merely a portion of the limiting portion 184, and the portion of the limiting portion 184 has the first width W1 in the first direction D1 (as shown in FIG. 5B, FIG. 6C, and FIG. 6D). The limiting slot 185 has the second width W2 in the second direction D2 perpendicular to the first direction D1 (as shown in FIG. 5B, FIG. 6C, and FIG. 6D). Therefore, in this embodiment, through the arrangement of the limiting slot 185, only a part of the limiting portion 184 can be accommodated in the limiting assembling portion 173, while the other part of the limiting portion 184 cannot be received in the limiting assembling portion 173 owing that the size of the other part of the limiting portion 184 is greater than the opening size (the opening width OW shown in FIG. 6B, which will be described later) of the limiting assembling portion 173 in the first direction D1. Hence, the limiting assembling portion 173 can limit the limiting portion 184 in the second direction D2.

Figure 4A:
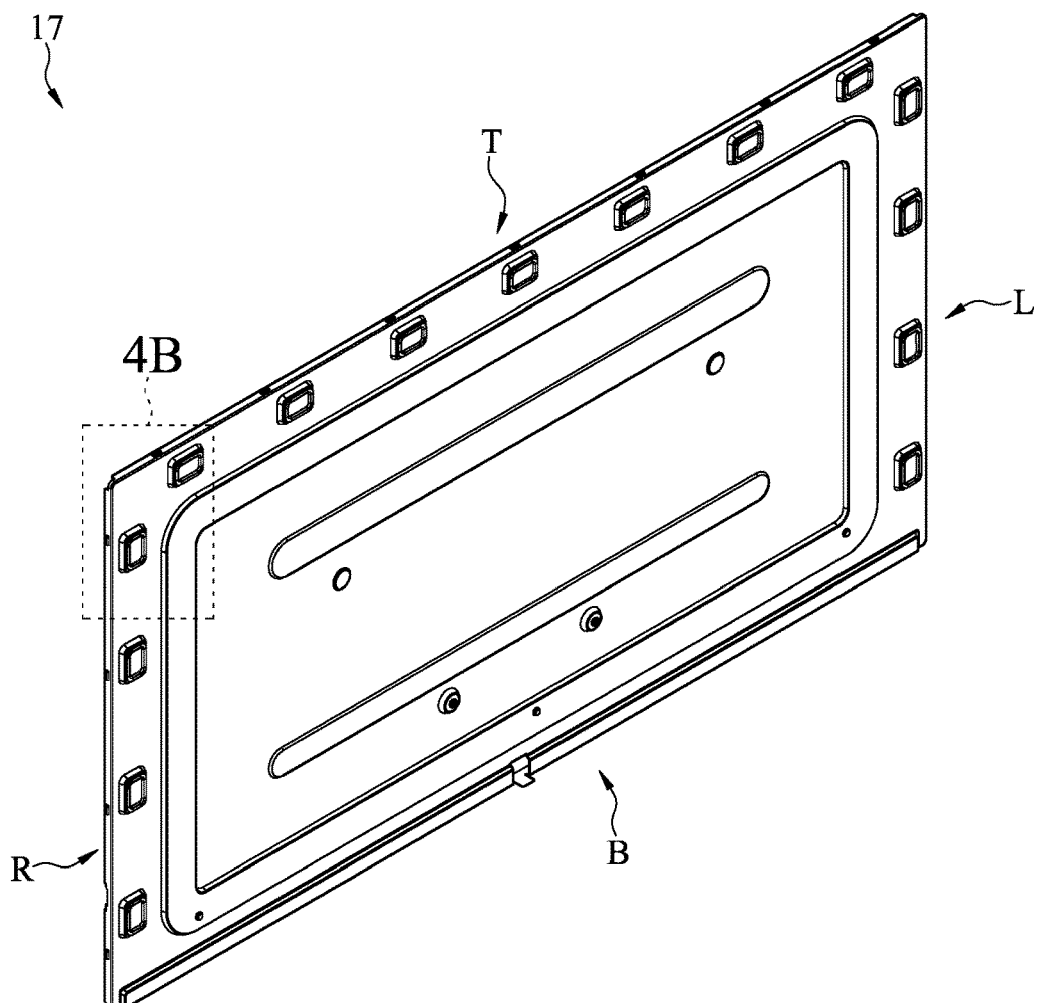
FIG. 4A illustrates a first perspective view of a middle-rear frame of a display device according to some embodiments.
Figure 4B:
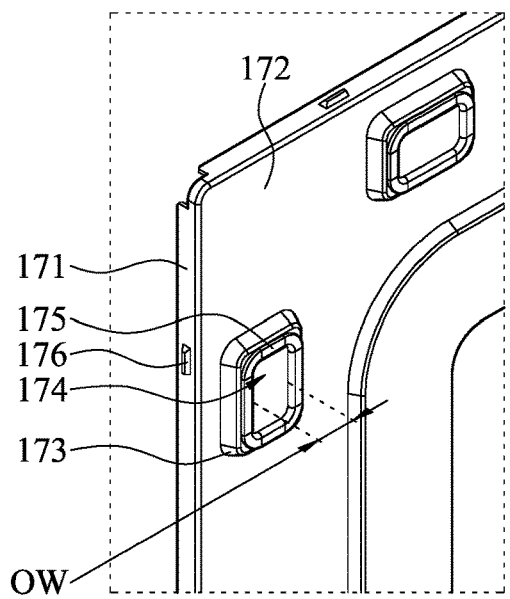
FIG. 4B illustrates an enlarged partial perspective view of the middle-rear frame of the display device according to some embodiments shown in FIG. 4A.

Please refer to FIG. 4A, FIG. 4B, FIG. 5B, and FIG. 6B. FIG. 4A illustrates a first perspective view of a middle-rear frame 17 of a display device 1 according to some embodiments, and FIG. 4B illustrates an enlarged partial perspective view of the middle-rear frame 17 of the display device 1 according to some embodiments shown in FIG. 4A. FIG. 6B illustrates a second partial cross-sectional schematic view of a display device 1 according to some embodiments, which is just one of the various implementations of the connection and assembling arrangements of the outer frame of the display device 1. The embodiments of the instant disclosure include, but are not limited to, the embodiments shown in FIG. 6B. In this embodiment, the limiting assembling portion 173 has an opening 174. The opening 174 has an opening width OW in the first direction D1 (as shown in FIG. 4B), and the opening 174 has an opening depth OD in the second direction D2 (as shown in FIG. 6B). The opening width OW is greater than the first width W1 (as shown in FIG. 6B), thus leaving a first allowance between the limiting assembling portion 173 and the limiting portion 184 in the first direction D1. The opening depth OD is greater than the second width W2 (as shown in FIG. 6B), thus leaving a second allowance between the limiting assembling portion 173 and the limiting portion 184 in the second direction D2. Therefore, through the arrangement of the first allowance and the second allowance, in this embodiment, only a part of the limiting portion 184 can be received in the limiting assembling portion 173. In addition, the part of the limiting portion 184 can perform at most a displacement of the first allowance in the first direction D1 and can perform at most a displacement of the second allowance in the second direction D2, thereby limiting the rear shell 18 and the limiting portion 184 in the limiting assembling portion 173 along the first direction D1 and the second direction D2. According to some embodiments, the opening width OW is greater than the first width W1 at least by 0.2 mm; in other words, the first allowance is at least 0.2 mm; for example, the first allowance may be greater than 0.2 mm, or greater than 0.25 mm, or greater than 0.3 mm, and so on. According to some embodiments, the opening depth OW is greater than the second width W2 at least by 0.2 mm; in other words, the second allowance is at least 0.2 mm; for example, the second allowance may be greater than 0.2 mm, or greater than 0.25 mm, or greater than 0.3 mm, and so on.

Please refer again to FIG. 6B. According to some embodiments, the inner edge of the opening 174 of the limiting assembling portion 173 has a reverse-folded portion 175. The reverse-folded portion 175 has a smooth plane or a curved surface at the inner edge of the opening 174. In addition, due to the folded structure of the reverse-folded portion 175, the opening depth OD of the limiting assembling portion 173 can be thus increased in the second direction D2. Therefore, in some embodiments of the instant disclosure, damages of the limiting slot 185 (as shown in FIG. 5B) due to the sharp inner edge of the opening 174 can be prevented, thereby avoiding affecting the limiting effect of the limiting slot 185 to the limiting assembling portion 173. The reverse-folded portion 175 may be formed directly upon the formation of the middle-rear frame 17 or by post-processing the reverse-folded portion 175 after the middle-rear frame 17 is formed, which is not limited here and should be included in the scope of the embodiments of the instant disclosure.

Please refer again to FIG. 5B. According to some embodiments, the rear shell 18 further has a plurality of limiting portions 184. As mentioned above, each of the limiting portions 184 has two ends, one of the two ends is on the rear-shell bottom plate 182, and the other end is in the corresponding one of the limiting assembling portions 173. According to some embodiments, any two of the limiting portions 184 have respectively a limiting portion 184, and the two limiting portions 184 are formed as a limiting assembly. One of the limiting portions 184 in the limiting assembly has a limiting slot 185 on a side of the limiting portion 184, and the side of the limiting portion 184 is away from the front-frame side plate 111. The other one of the limiting portions 184 in the limiting assembly has another limiting slot 185 on the other side of the limiting portion 184, and the other side of the limiting portion 184 is adjacent to the front-frame side plate 111. In other words, the two limiting slots 185 are respectively on the two opposite sides of the limiting portions 184 (as shown in FIG. 5B). In this embodiment, being similar to the arrangement of the embodiment with one limiting portion 184 and one opening 174, each of the two limiting slots 185 also has a first width W1 in the first direction D1 and a second width W2 in the second direction D2. Details about the arrangement of the limiting portion 184 and the opening 174 are already mentioned above and not be described here again. Therefore, the limiting assembly can be limited at the inner edge of the opening 174 of the limiting assembling portion 173 (as shown in FIG. 6B and FIG. 6D), so that the two limiting portions 184 of the limiting assembly can be limited in opposite directions (such as the forward and reverse directions of the first direction D1).

According to some embodiments, the rear shell 18 further has a limiting connection portion 186, and the limiting connection portion 186 is connected to the limiting portions 184. Similarly, the term "connected/connection" are independently refer to the same or different connection manner, and the connection manner may include molded in one-piece member (that is, integrally formed) or other physical connections (such as adhering, buckling, joggling or locking), all of which are included within the scope of the embodiments according to the instant disclosure. In FIG. 5B, the rear shell 18 further has a plurality of limiting portions 184 and a limiting connection portion 186. Any two of the limiting portions 184 are formed as a limiting assembly, and the limiting connection portion 186 is connected between the two limiting portions 184 of the limiting assembly. Therefore, through the arrangement of the limiting connection portion 186 between the two limiting portions 184, the structural strength (such as the impact strength and/or the durability) of the limiting portions 184 (as well as the limiting assembly formed by any two of the limiting portions 184) can be strengthened. Hence, according to some embodiments of the instant disclosure, the limiting portions 184 can be prevented from being deformed or damaged due to being limited in the limiting assembling portion 173 for a long time.

Please refer to FIG. 6A. FIG. 6A illustrates a first partial cross-sectional schematic view of a display device 1 according to some embodiments, which is just one of the various implementations of the connection and assembling arrangements of the outer frame of the display device 1. The embodiments of the instant disclosure include, but are not limited to, the embodiments shown in FIG. 6A. In this embodiment, the front frame 11 further has a first blocking portion 114, and the first blocking portion 114 is on the front-frame edge plate 112 and between the panel assembly 13 and the middle-frame side plate 151. In FIG. 6A, the front frame 11 further has a first blocking portion 114, the first blocking portion 114 is a rib-like convex portion, and the first blocking portion 114 is on the front-frame edge plate 112 and between the panel assembly 13 and the middle-frame side plate 151. According to some embodiments, a gap is between the first blocking portion 114 and the front-frame side plate 111, so that the middle-frame side plate 151 may be disposed in the gap to dispose the middle-frame side plate 151 between the front-frame side plate 111 and the first blocking portion 114. Therefore, through the arrangement of the first blocking portion 114, the panel assembly 13 can be prevented from directly contacting the front-frame side plate 111 and/or the middle-frame side plate 151. Therefore, the outer frame of the panel assembly 13 (that is, portions of the panel assembly 13 which would have been in direct contact with the front-frame side plate 111 and/or the middle-frame side plate 151) can be prevented from being damaged upon the outer portion of the display device 1 is impacted by external forces or upon the display device 1 falls down.

According to some embodiments, the middle-rear frame 17 further has a third fixing portion 176, and the third fixing portion 176 is buckled to the middle-frame side plate 151. According to some embodiments, the middle frame 15 further has a third assembling portion 155, and the third fixing portion 176 is buckled to the third assembling portion 155. The third assembling portion 155 may be a concave portion or a convex portion, which is disposed corresponding to the third fixing portion 176, so that the third assembling portion 155 and the third fixing portion 176 can be matched and buckled with each other. The term "matched and buckled" refers to a physically fixing arrangement between the elements that are buckled with each other, which can be removed when an external force exceeding a certain threshold value is applied to the elements. Hence, the term "matched and buckled" also covers the detachable buckling connections as well as the buckling connections that can be disassembled and assembled repeatedly. Therefore, the third assembling portion 155 and the third fixing portion 176 are matched and buckled with each other, thereby fixing the middle frame 15 to the middle-rear frame 17. According to some embodiments, the third fixing portion 176 is a convex portion, and the third assembling portion 155 is a concave portion; in contrast, for another example, the third fixing portion 176 is a concave portion, and the third assembling portion 155 is a convex portion. In FIG. 6A, the middle-rear frame 17 further has a third fixing portion 176, and the third fixing portion 176 is a convex portion on the middle-rear-frame side plate 171. The middle frame 15 further has a third assembling portion 155, and the third assembling portion 155 is a concave portion corresponding to the third fixing portion 176 and on the middle-frame side plate 151. Therefore, the third fixing portion 176 of the middle-rear frame 17 is buckled to the third assembling portion 155 of the middle frame 15, thereby fixing the middle-rear frame 17 to the middle frame 15. For example, in FIG. 6A, the third assembling portion 155 is a concave portion on the middle-frame side plate 151 which is adjacent to the side of the middle-rear-frame side plate 171, and the third fixing portion 176 is a convex portion on the middle-rear-frame side plate 171 which is adjacent to the side of the middle-frame side plate 151. The third assembling portion 155 is correspondingly matched and buckled to the third fixing portion 176. Therefore, the third assembling portion 155 and the third fixing portion 176 are buckled with each other, thereby fixing the middle-rear frame 17 to the middle frame 15.

According to some embodiments, the middle-frame bottom plate 152 has a groove (as shown in FIG. 6A). The groove is on a side of the middle-frame bottom plate 152, and the side of the middle-frame bottom plate 152 is away from the front-frame edge plate 112. The middle-rear-frame side plate 171 is in the groove. Therefore, through the arrangement of the groove of the middle-frame bottom plate 152, according to some embodiments of the instant disclosure, the middle-rear frame 17 can be positioned with the middle frame 15. In FIG. 6A, the middle-frame bottom plate 152 has an elongated groove. The groove is on a side of the middle-frame bottom plate 152, and the side of the middle-frame bottom plate 152 is away from the front-frame edge plate 112. A part of the middle-rear-frame side plate 171 is in the groove, so that the middle-rear frame 17 can be positioned and fixed to the middle frame 15 more stably.

The implementations of the components of the outer frame of the display device 1 will be described as below.

Figure 2A:
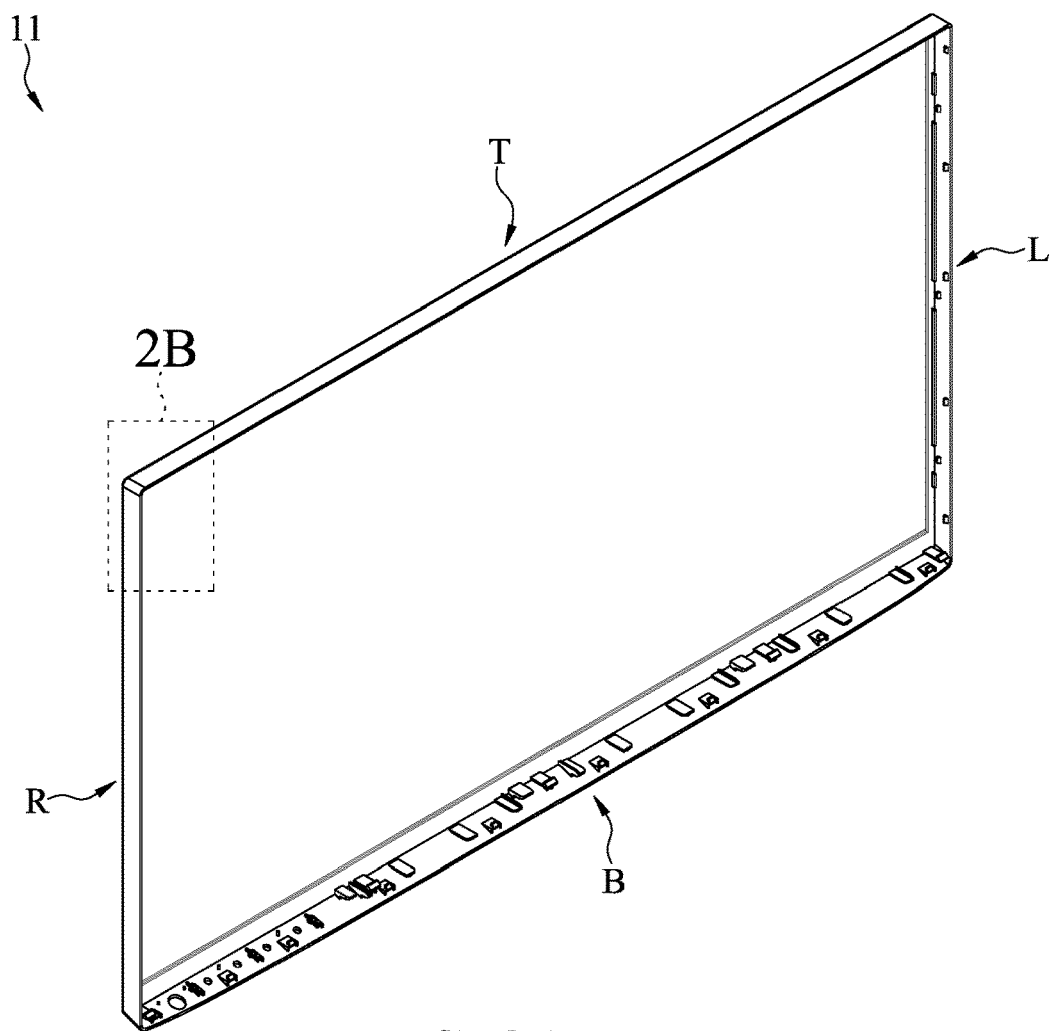
FIG. 2A illustrates a first perspective view of a front frame of a display device according to some embodiments.
Figure 2B:
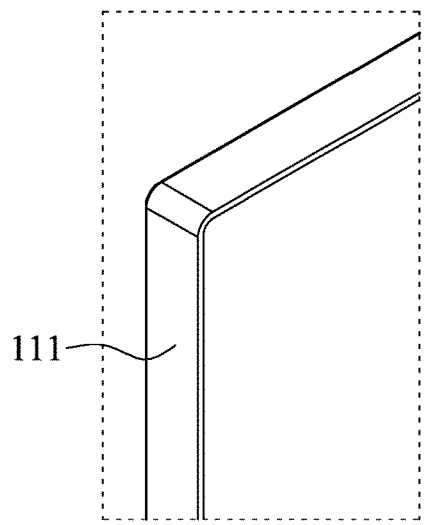
FIG. 2B illustrates an enlarged partial perspective view of the front frame of the display device according to some embodiments shown in FIG. 2A.
Figure 2C:
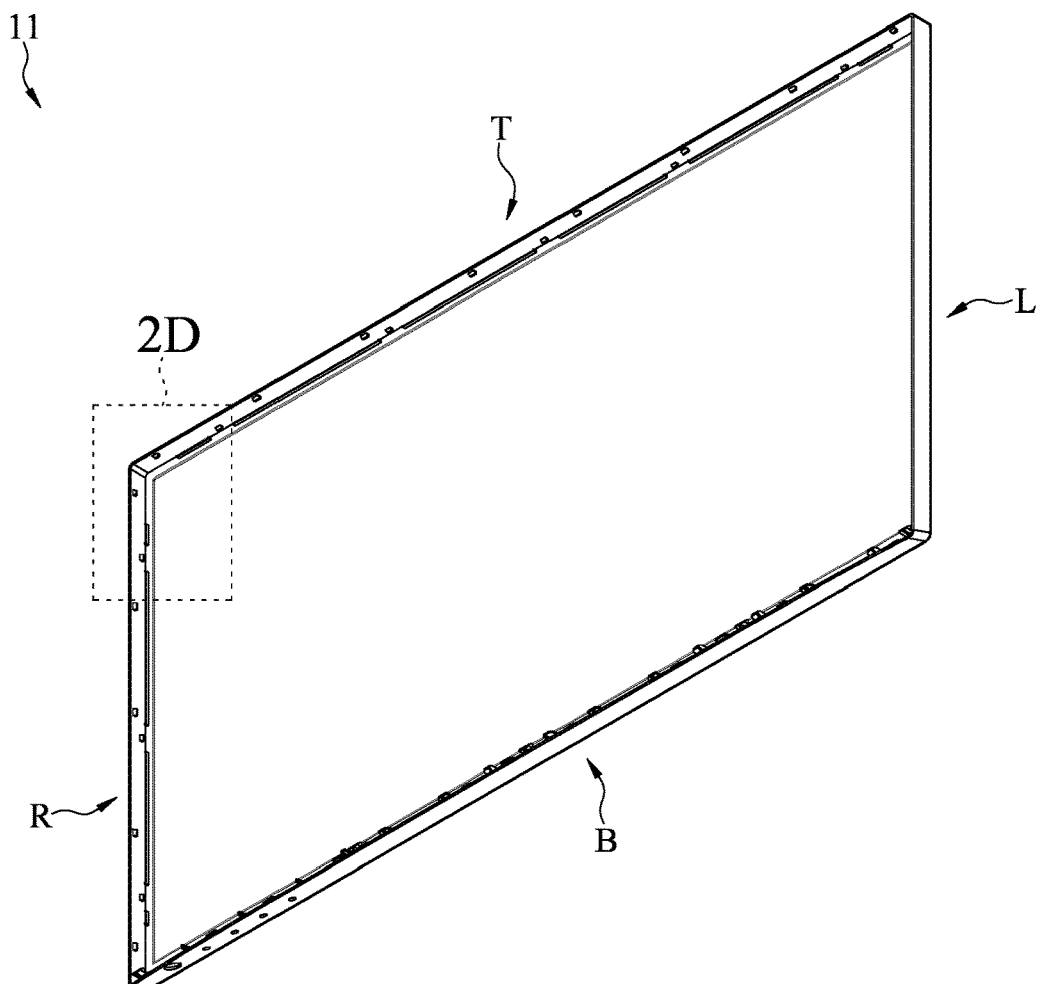
FIG. 2C illustrates a second perspective view of a front frame of a display device according to some embodiments.
Figure 2D:
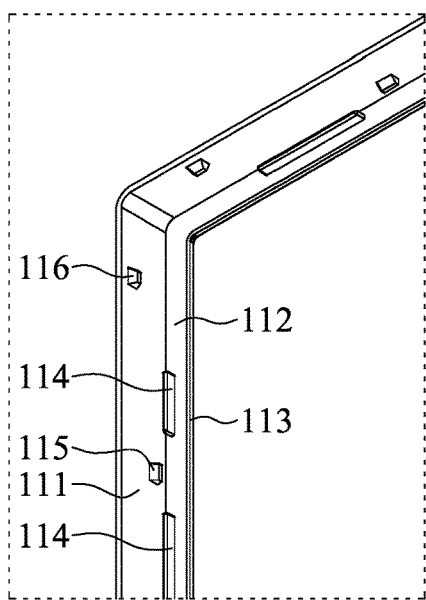
FIG. 2D illustrates an enlarged partial perspective view of the front frame of the display device according to some embodiments shown in FIG. 2C.

Regarding the front frame 11, please refer to FIG. 2A to FIG. 2D. FIG. 2A and FIG. 2C respectively illustrate first and second perspective views of a front frame 11 of a display device 1 according to some embodiments; FIG. 2B and FIG. 2D respectively illustrate enlarged partial perspective views of the front frame 11 of the display device 1 according to some embodiments shown in FIG. 2A and FIG. 2C. The material of the front frame 11 may be plastic, rubber, metal, or alloy material, which is not limited herein and should be included in the scope of the embodiments of the instant disclosure. Preferably, in some embodiments, the material of the front frame 11 is plastic. In FIG. 2A to FIG. 2D, the front frame 11 of any side of the T side (the top side), the L side (the left side), the R side (the right side) and combinations of the sides of the display device 1 comprises a front-frame side plate 111 and a front-frame edge plate 112. Each of the front-frame side plates 111 may optionally have one or more first fixing portions 115, and/or each of the front-frame side plates 111 may optionally have one or more second fixing portions 116. The first fixing portion 115 and the second fixing portion 116 have been described above and not be described here again. In addition, each of the front-frame edge plates 112 may optionally have one or more first blocking portions 114. The first blocking portion 114 has been described above and not be described here again. According to some embodiments, each of the front-frame edge plates 112 has a plurality of first blocking portions 114, and each of the front-frame side plates 111 has a first fixing portion 115. The first fixing portions 115 is correspondingly disposed between any two of the first blocking portions 114. In other words, in this embodiment, the two first blocking portions 114 and the first fixing portion 115 are arranged alternately (as shown in FIG. 2D). Therefore, the first fixing portion 115 and the middle-frame side plate 151 may be assembled as shown in FIG. 6D, and the first blocking portion 114 and the middle-frame side plate 151 may be assembled in any of the possible arrangements as shown in FIG. 6A to FIG. 6C. The above-mentioned various possible assembling arrangements between the first blocking portion 114 and the middle-frame side plate 151 should all be included in the scope of the embodiments of the instant disclosure. In addition, any combination of the assembling arrangements should also be included in the scope of the embodiments of the instant disclosure. For example, in some embodiments, the display device 1 not only has the assembling arrangement between the first fixing portions 115 and the middle-frame side plate 151 as shown in FIG. 6D, the display device 1 may further have one or more assembling arrangements of the first blocking portion 114 and the middle-frame side plate 151 as shown in FIG. 6A to FIG. 6C, and all of the above possible assembling arrangements should be included in the scope of the embodiments of the instant disclosure. Accordingly, according to some embodiments of the instant disclosure, the front frame 11 can be fixed to the middle frame 15 more stably.

Figure 3A:
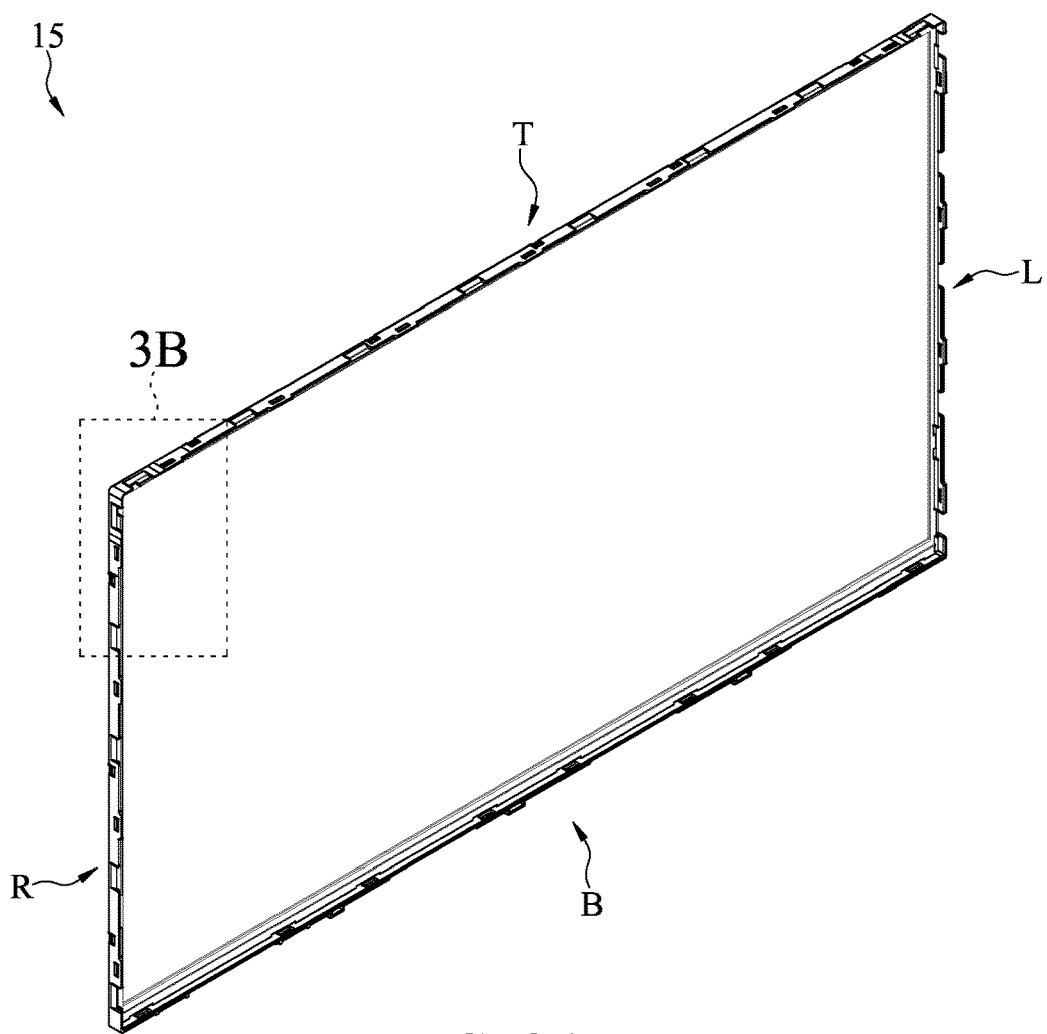
FIG. 3A illustrates a first perspective view of a middle frame of a display device according to some embodiments.
Figure 3B:
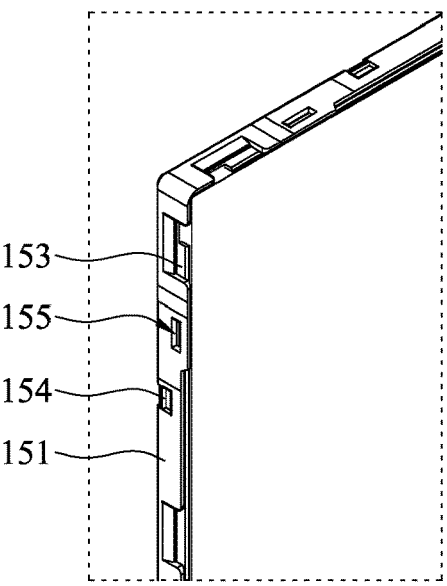
FIG. 3B illustrates an enlarged partial perspective view of the middle frame of the display device according to some embodiments shown in FIG. 3A.
Figure 3C:
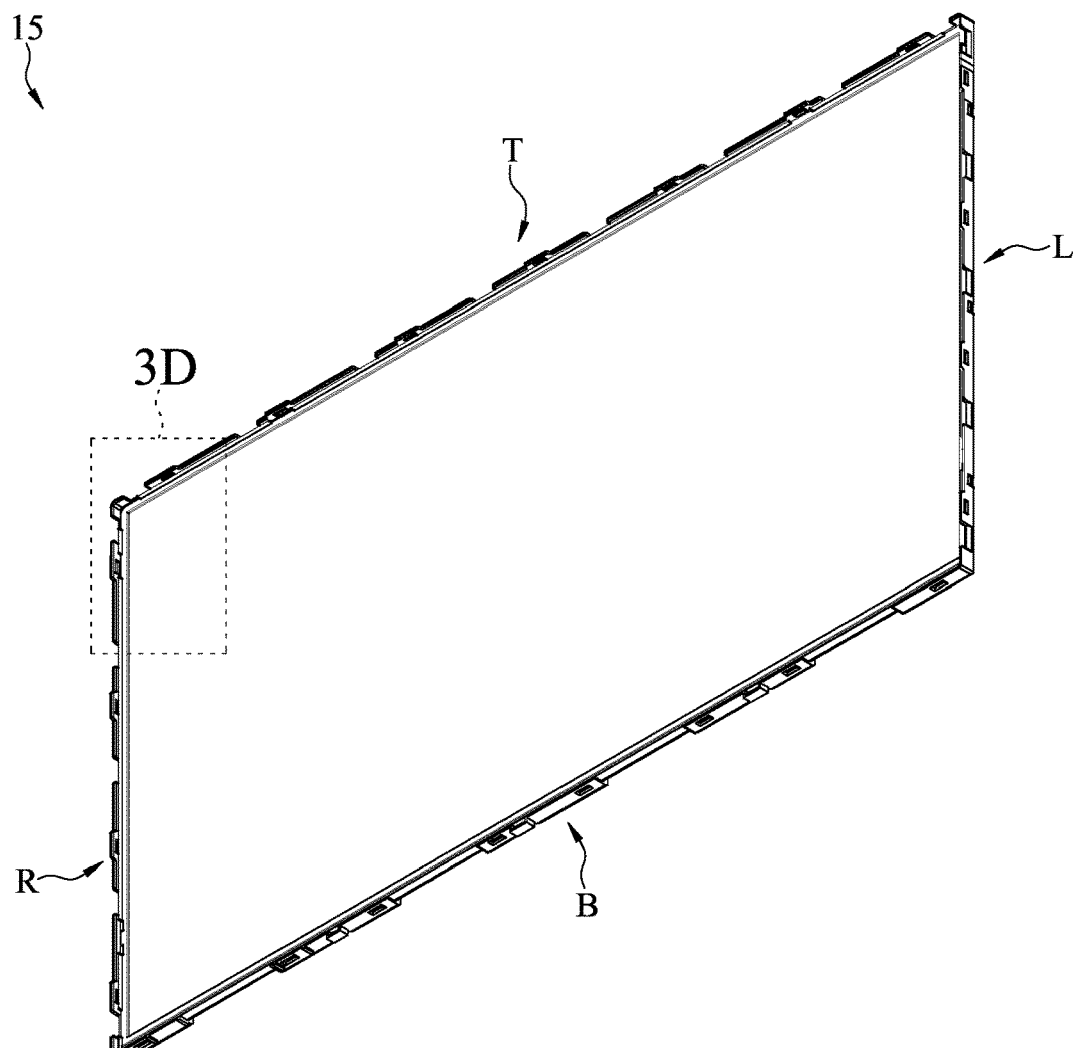
FIG. 3C illustrates a second perspective view of a middle frame of a display device according to some embodiments.
Figure 3D:
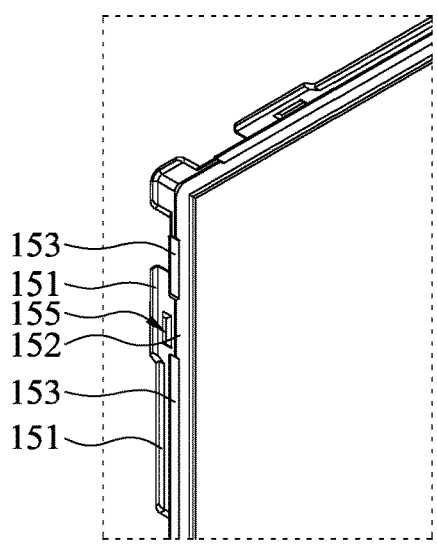
FIG. 3D illustrates an enlarged partial perspective view of the middle frame of the display device according to some embodiments shown in FIG. 3C.

Regarding the middle frame 15, please refer to FIG. 3A to FIG. 3D. FIG. 3A and FIG. 3C respectively illustrate first and second perspective views of a middle frame 15 of a display device 1 according to some embodiments; FIG. 3B and FIG. 3D respectively illustrate enlarged partial perspective views of the middle frame 15 of the display device 1 according to some embodiments shown in FIG. 3A and FIG. 3C. The material of the middle frame 15 may be plastic, rubber, metal, or alloy material, which is not limited herein and should be included in the scope of the embodiments of the instant disclosure. Preferably, in some embodiments, the material of the middle frame 15 is plastic. In FIG. 3A to FIG. 3D, the middle frame 15 of any side of the T side (the top side), the L side (the left side), the R side (the right side) and combinations of the sides of the display device 1 comprises a middle-frame side plate 151 and a middle-frame bottom plate 152. Each of the middle-frame side plates 151 may optionally have one or more first assembling portions 154, and/or each of the middle-frame side plates 151 may optionally have one or more third assembling portions 155. The first assembling portion 154 and the third assembling portion 155 have been described above and not be described here again. In addition, each of the middle-frame bottom plates 152 may optionally have one or more second blocking portions 153. The second blocking portion 153 has been described above and not described here again. According to some embodiments, each of the middle-frame bottom plates 152 has a plurality of second blocking portion 153, and each of the middle-frame side plates 151 has a third assembling portion 155. The third assembling portion 155 is correspondingly disposed between any two of the second blocking portion 153. In other words, in this embodiment, the two second blocking portion 153 and the third assembling portion 155 are arranged alternately (as shown in FIG. 3D). Therefore, the second blocking portion 153 and the middle-rear-frame side plate 171 may be assembled in any of the possible arrangements as shown in FIG. 6C to FIG. 6D, and the third assembling portion 155 and the middle-rear-frame side plate 171 may be assembled as shown in FIG. 6A. The above-mentioned various possible assembling arrangements between the second blocking portion 153 and the middle-rear-frame side plate 171 should all be included in the scope of the embodiments of the instant disclosure. In addition, any combination of the assembling arrangements should also be included in the scope of the embodiments of the instant disclosure. For example, in some embodiments, the display device 1 not only has the assembling arrangement between the third assembling portion 155 and the middle-rear-frame side plate 171 as shown in FIG. 6A, the display device 1 may further have one or more assembling arrangements of the second blocking portion 153 and the middle-rear-frame side plate 171 as shown in FIG. 6C to FIG. 6D, and all of the above possible assembling arrangements should be included in the scope of the embodiments of the instant disclosure. Accordingly, according to some embodiments of the instant disclosure, the middle frame 15 can be fixed to the middle-rear frame 17 more stably.

Figure 4C:
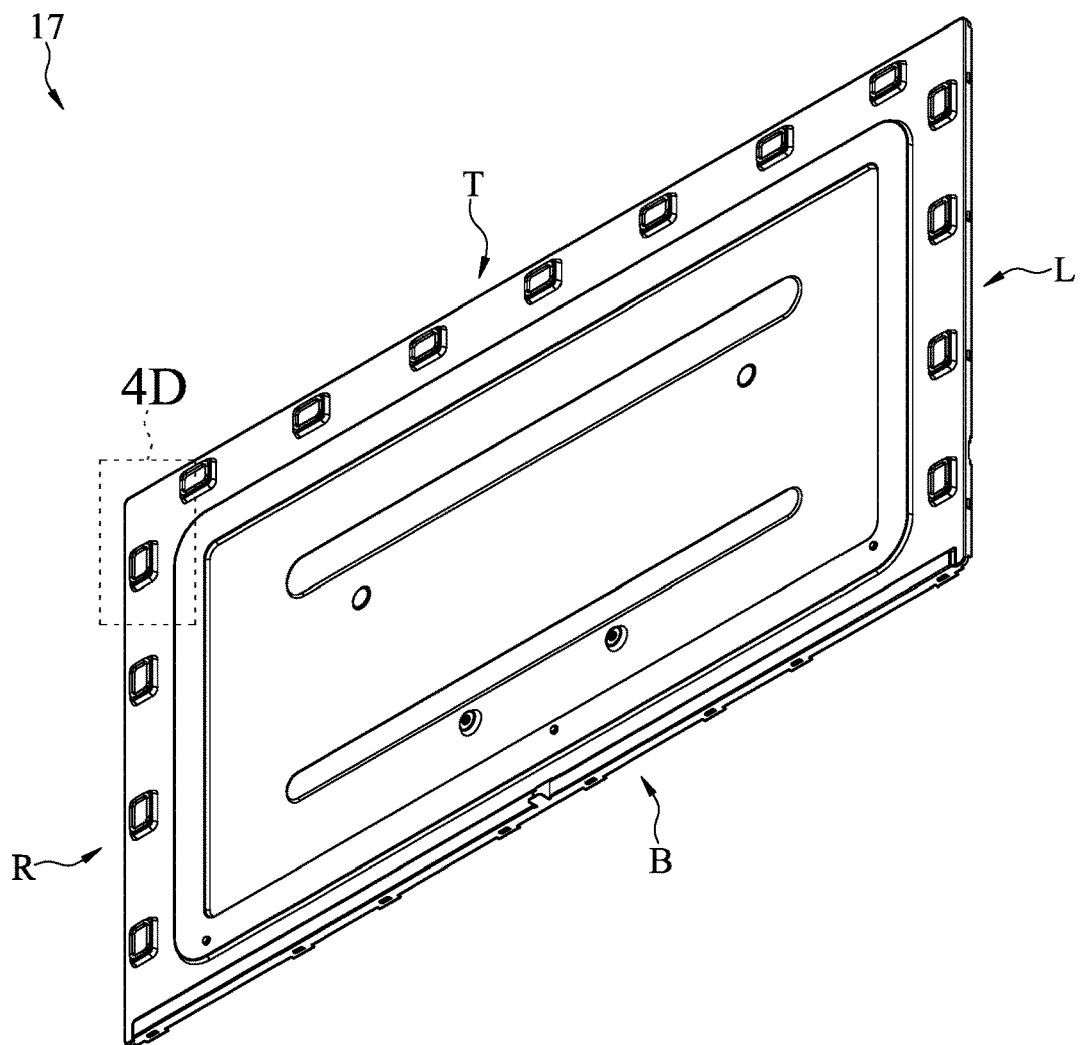
FIG. 4C illustrates a second perspective view of a middle-rear frame of a display device according to some embodiments.
Figure 4D:
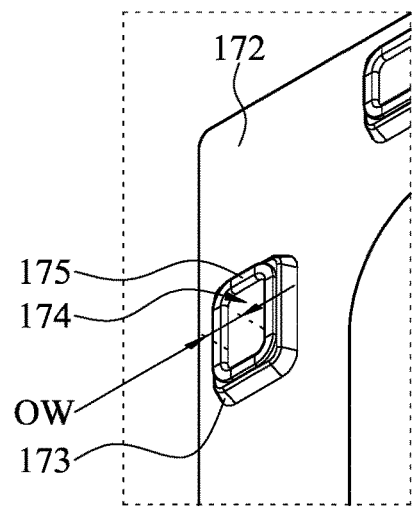
FIG. 4D illustrates an enlarged partial perspective view of the middle-rear frame of the display device according to some embodiments shown in FIG. 4C.

Regarding the middle-rear frame 17, please refer to FIG. 4A to FIG. 4D. FIG. 4A and FIG. 4C respectively illustrate first and second perspective views of a middle-rear frame 17 of a display device 1 according to some embodiments; FIG. 4B and FIG. 4D respectively illustrate enlarged partial perspective views of the middle-rear frame 17 of the display device 1 according to some embodiments shown in FIG. 4A and FIG. 4C. The material of the middle-rear frame 17 may be plastic, rubber, metal, or alloy material, which is not limited herein and should be included in the scope of the embodiments of the instant disclosure. Preferably, in some embodiments, the material of the middle-rear frame 17 is metal or alloy. In FIG. 4A to FIG. 4D, the middle-rear frame 17 of any side of the T side (the top side), the L side (the left side), the R side (the right side) and combinations of the sides of the display device 1 comprises a middle-rear-frame side plate 171 and a middle-rear-frame bottom plate 172, and the middle-rear-frame side plates 171 share the same middle-rear-frame bottom plate 172. Each of the middle-rear-frame side plates 171 may optionally have one or more third fixing portions 176. The third fixing portion 176 has been described above and not be described here again. In addition, the middle-rear-frame bottom plate 172 adjacent to the sides of the display device 1 may optionally have one or more limiting assembling portions 173. The limiting assembling portion 173 has been described above and not be described here again.

Figure 5C:
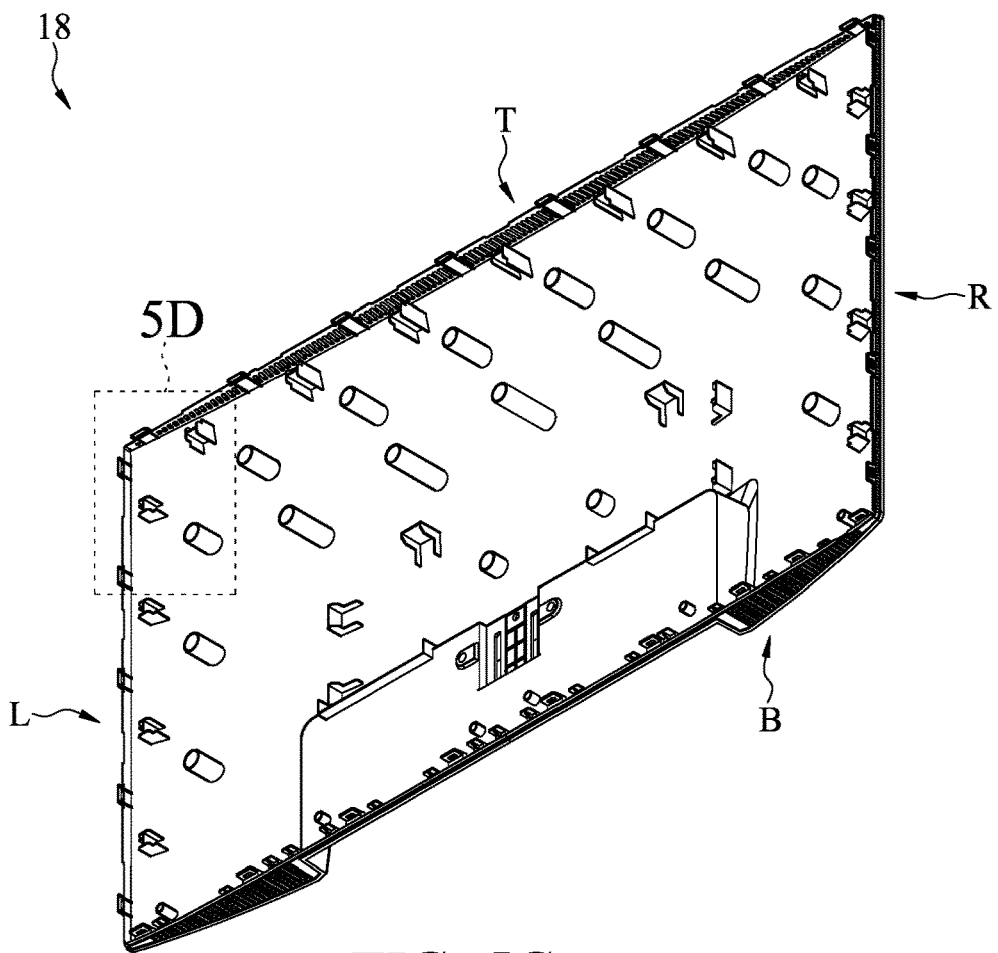
FIG. 5C illustrates a second perspective view of a rear shell of a display device according to some embodiments.
Figure 5D:
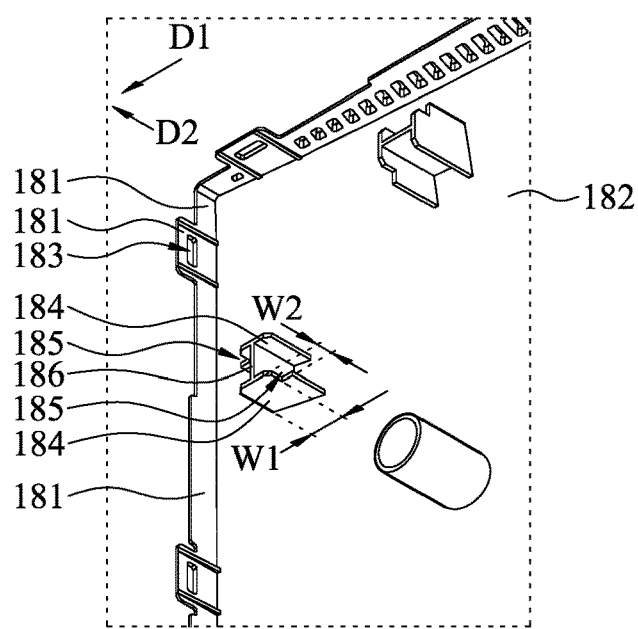
FIG. 5D illustrates an enlarged partial perspective view of the rear shell of the display device according to some embodiments shown in FIG. 5C.

Regarding the rear shell 18, please refer to FIG. 5A to FIG. 5D. FIG. 5A and FIG. 5C respectively illustrate first and second perspective views of a rear shell 18 of a display device 1 according to some embodiments; FIG. 5B and FIG. 5D respectively illustrate enlarged partial perspective views of the rear shell 18 of the display device 1 according to some embodiments shown in FIG. 5A and FIG. 5C. The material of the rear shell 18 may be plastic, rubber, metal, or alloy material, which is not limited herein and should be included in the scope of the embodiments of the instant disclosure. Preferably, in some embodiments, the material of the rear shell 18 is metal or alloy. In FIG. 5A to FIG. 5D, the rear shell 18 of any side of the T side (the top side), the L side (the left side), the R side (the right side) and combinations of the sides of the display device 1 comprises a rear-shell side plate 181 and a rear-shell bottom plate 182, and the rear-shell side plates 181 share the same rear-shell bottom plate 182. Each of the rear-shell side plates 181 may optionally have one or more second assembling portion 183. The second assembling portion 183 has been described above and not be described here again. In addition, the rear-shell bottom plate 182 adjacent to the sides of the display device 1 may optionally have one or more limiting portions 184. The limiting portion 184 has been described above and not be described here again.

Based on the above, according to one or some embodiments of the instant disclosure, through adjusting the assembling arrangement between a front frame and a middle frame, between the middle frame and a middle-rear frame, and/or between the front frame and the middle-rear frame (even through the assembling arrangement between the front frame and a rear shell and/or between the middle-rear frame and the rear shell), the front-frame edge plate widths of the display device may be further reduced (about 50% in reduction compared to the conventional front-frame edge plate widths). Hence, according to some embodiments of the instant disclosure, a display device that still has its original function but has a more aesthetically designed appearance is provided. Therefore, the technical problems to be solved have been properly solved by some embodiments of the instant disclosure. Moreover, according to some embodiments of the instant disclosure, a display device with a relatively lighter overall weight and a relatively larger image-display area is provided.

Although the present disclosure is disclosed in the foregoing embodiments as above, it is not intended to limit the present disclosure. Any person who is familiar with the relevant art can make some changes and modifications without departing from the spirit and scope of the present disclosure. Therefore, the scope of the present disclosure shall be subject to the definition of the scope of patent application attached to the specification.

What is claimed is:

1. A display device comprising:
   a front frame having a front-frame side plate, a front-frame edge plate, a first fixing portion, and a second fixing portion, wherein the front-frame edge plate is connected to the front-frame side plate, and the first fixing portion and the second fixing portion are on the front-frame side plate;
   a middle frame having a middle-frame side plate, a middle-frame bottom plate, and a first assembling portion, wherein the middle-frame bottom plate is connected to the middle-frame side plate, the middle-frame side plate is adjacent to the front-frame side plate and the front-frame edge plate, and the first assembling portion is on the middle-frame side plate and buckled to the first fixing portion;
   a panel assembly being adjacent to the front-frame edge plate and the middle-frame side plate;
   a middle-rear frame having a middle-rear-frame side plate, a middle-rear-frame bottom plate, and a limiting assembling portion, wherein the middle-rear-frame bottom plate is connected to the middle-rear-frame side plate, the middle-rear-frame side plate is adjacent to the middle-frame side plate and the middle-frame bottom plate, and the limiting assembling portion is on the middle-rear-frame bottom plate;
   a backlight assembly being adjacent to the middle-frame bottom plate and the middle-rear-frame side plate; and
   a rear shell having a rear-shell side plate, a rear-shell bottom plate, and a second assembling portion, wherein the rear-shell bottom plate is connected to the rear-shell side plate, the second assembling portion is on the rear-shell side plate, the rear-shell side plate is between the middle-rear-frame side plate and the front-frame side plate to have the second assembling portion buckled to the second fixing portion, and the limiting assembling portion limits the rear shell.

2. The display device according to claim 1, wherein the front-frame edge plate has a first blocking portion between the panel assembly and the middle-frame side plate.

3. The display device according to claim 1, wherein the first fixing portion has a guiding bevel, and a height of the guiding bevel increases along a direction in which the first assembling portion is buckled to the first fixing portion.

4. The display device according to claim 1, wherein the middle frame has a second blocking portion between the backlight assembly and the middle-rear-frame side plate.

5. The display device according to claim 1, wherein the rear shell has a limiting portion; one of two ends of the limiting portion is on the rear-shell bottom plate, and the other end of the limiting portion is in the limiting assembling portion.

6. The display device according to claim 5, wherein the limiting portion has a limiting slot on a side of the limiting portion, and the side of the limiting portion faces the limiting assembling portion; the limiting portion has a first width in a first direction, and the limiting slot has a second width in a second direction; the first direction is parallel to the direction of the middle-rear-frame bottom plate, and the second direction is perpendicular to the first direction.

7. The display device according to claim 6, wherein the limiting assembling portion has an opening.

8. The display device according to claim 7, wherein the opening has an opening width in the first direction and an opening depth in the second direction, the opening width is greater than the first width, and the opening depth is greater than the second width.

9. The display device according to claim 8, wherein the opening width is greater than the first width by at least 0.2 mm, and the opening depth is greater than the second width by at least 0.2 mm.

10. The display device according to claim 1, wherein the rear shell has a plurality of limiting portions; each of the limiting portions has two ends, one of the two ends is on the rear-shell bottom plate, and the other end is in the limiting assembling portion.

11. The display device according to claim 10, wherein the rear shell has a limiting connection portion connected to the limiting portions.

12. The display device according to claim 1,
    wherein:
    the middle frame has
    a second blocking portion between the backlight assembly and the middle-rear-frame side plate;
    the limiting assembling portion has an opening; and
    the rear shell has a limiting portion, one of two ends of the limiting portion is on the rear-shell bottom plate, and the other end of the limiting portion has a limiting slot on a side of the limiting portion, and the side of the limiting portion faces the limiting assembling portion; the limiting portion has a first width in a first direction, and the limiting slot has a second width in a second direction; the first direction is parallel to the direction of the middle-rear-frame bottom plate, the second direction is perpendicular to the first direction, and the other end of the limiting portion is in the limiting assembling portion.

13. The display device according to claim 1, wherein the middle-rear frame has a third fixing portion, and the third fixing portion is buckled to the middle-frame side plate.

14. The display device according to claim 13, wherein the middle frame has a third assembling portion, and the third assembling portion is buckled to the third fixing portion.

* * * * *